(12) United States Patent
Singh et al.

(10) Patent No.: US 12,135,966 B2
(45) Date of Patent: *Nov. 5, 2024

(54) CONFIGURATION-DRIVEN APPLICATIONS

(71) Applicant: Quicket Solutions, Inc., Chicago, IL (US)

(72) Inventors: Akshay Singh, Chicago, IL (US); Scott Knowles, Chicago, IL (US); John Pierce, Chicago, IL (US); Bryan Chance, Chicago, IL (US); Zhuofan Zhang, Chicago, IL (US); John Sternberg, Chicago, IL (US); Adam Debuysscher, Chicago, IL (US)

(73) Assignee: Quicket Solutions, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/501,643

(22) Filed: Nov. 3, 2023

(65) Prior Publication Data

US 2024/0061678 A1 Feb. 22, 2024

Related U.S. Application Data

(63) Continuation of application No. 17/203,633, filed on Mar. 16, 2021, now Pat. No. 11,842,187.

(Continued)

(51) Int. Cl.
*G06F 8/71* (2018.01)
*G06F 8/10* (2018.01)
(Continued)

(52) U.S. Cl.
CPC ............... *G06F 8/71* (2013.01); *G06F 8/10* (2013.01); *G06F 8/24* (2013.01); *G06F 8/65* (2013.01); *G06F 8/76* (2013.01)

(58) Field of Classification Search
CPC ..... G06F 8/71; G06F 8/10; G06F 8/24; G06F 8/65; G06F 8/76; G06F 8/70; G06F 8/60; G06F 8/20
(Continued)

(56) References Cited

U.S. PATENT DOCUMENTS 8,584,114 B2 * 11/2013 Rabinovich ............... G06F 8/51
717/174
9,268,562 B1 * 2/2016 Mangtani .................. G06F 8/71
(Continued)

OTHER PUBLICATIONS

Almeida et al, "Platform-independent dynamic reconfiguration of distributed applications", 2004, [Online], pp. 1-6, [Retrieved from Internet on Jun. 3, 2024], <chrome-extension://efaidnbmnn-nibpcajpcglclefindmkaj/https://d1wqtxts1xzle7.cloudfront.net/87261869/01316628-libre.pdf?1654791956=&response-con>(Year: 2004).*

(Continued)

*Primary Examiner* — S. Sough
*Assistant Examiner* — Zengpu Wei
(74) *Attorney, Agent, or Firm* — POLSINELLI PC

(57) ABSTRACT

Methods, systems, and computer-readable media are provided for configuration-driven application deployments. An example method can include obtaining a platform-agnostic application configuration including a plurality of application components that can be interpreted by a plurality of system-specific application platforms to dynamically render different applications; based on the platform-agnostic application configuration, generating, by a computing device using a system-specific application platform, an application including a platform-specific interpretation of the platform-agnostic application configuration; and executing the application at the computing device.

20 Claims, 29 Drawing Sheets

Related U.S. Application Data

(60) Provisional application No. 62/990,199, filed on Mar. 16, 2020.

(51) Int. Cl.
*G06F 8/20* (2018.01)
*G06F 8/65* (2018.01)
*G06F 8/76* (2018.01)

(58) Field of Classification Search
USPC .......................................................... 717/120
See application file for complete search history.

(56) References Cited

U.S. PATENT DOCUMENTS

| | | |
|---|---|---|
| 2007/0250575 A1 | 10/2007 | Tseitlin et al. |
| 2013/0054812 A1 | 2/2013 | DeCoteau |
| 2014/0032581 A1 | 1/2014 | Young |
| 2014/0109078 A1 | 4/2014 | Lang |
| 2014/0208088 A1 | 7/2014 | Somani |
| 2015/0254074 A1* | 9/2015 | Padmavilasom ......... G06F 8/00 717/120 |
| 2015/0277939 A1 | 10/2015 | Johnson |
| 2016/0246594 A1 | 8/2016 | Shoavi |
| 2017/0185395 A1 | 6/2017 | Arians |
| 2017/0192981 A1 | 7/2017 | Glover |
| 2017/0337040 A1 | 11/2017 | Salvi |
| 2019/0004793 A1 | 1/2019 | Brebner |
| 2019/0050209 A1 | 2/2019 | Pandey |
| 2022/0012040 A1* | 1/2022 | Lin ....................... G06F 9/4887 |

OTHER PUBLICATIONS

PCT International Search Report and Written Opinion dated May 27, 2021 issued in PCT Application No. PCT/US21/22630 (7 pages).

Vijaya et al, "Framework for Platform Agnostic Enterprise Application Development Supporting Multiple Clouds", 2015, [Online], pp. 73-80, [Retrieved from internet on Oct. 4, 2023], <chrome extension://efaidnbmnnnibpcajpcglclefindmkaj/https:// pdf. sciencedirectassets.com/> (Year: 2015).

* cited by examiner

```
POST_PERSON_PHONENUMBER:
  actionType: endPointAction
  endPoit: "/person/{personQuin}/phoneNumber"
  httpMethod: POST
  name: POST_PERSON_PHONENUMBER:
  request:
    properties:
      phoneNumber:
        "$ref":"#/objects/phoneNumber/dataSchema"    — 522
        quin:
          description: Quin of the phoneNumber.
          type: string
        type: object
  Request_key: phoneNumber
  response:
    properties:
      phoneNumber:
        "$ref": "#/objects/phoneNumber/dataSchema"    — 524
        quin:
          description: Quin of the phoneNumber.
          type:string
        type:object
  response_key: phoneNumber
```

First

Middle

Last

Location category

Search location

Street

City

State

Phone number

Type

Email address

DOB

Age

To age

Sex

Choose an option

Race

Choose an option

FIG. 12B (Continued)

CONFIGURATION-DRIVEN APPLICATIONS

CROSS-REFERENCE TO RELATED APPLICATIONS

This application is a continuation of U.S. Non-Provisional patent application Ser. No. 17/203,633, filed on 16 Mar. 2021, which claims the benefit of priority to U.S. Provisional Patent Application No. 62/990,199, filed on 16 Mar. 2020, and entitled "CONFIGURATION-DRIVEN APPLICATION DESIGN, DEPLOYMENT, AND EXECUTION PLATFORM", the contents of which are incorporated herein by reference in their entirety and for all purposes.

TECHNICAL FIELD

The present disclosure generally relates to software application platforms and configuration-driven software applications.

BACKGROUND

Businesses, governments, and other entities frequently utilize multiple types of computers and operating systems to conduct their business and daily activities. Such a heterogeneous computing environment generally necessitates developing multiple versions of the same software to target the different computer and/or operating systems. This typically creates redundant development, design, and deployment work, and increases resource and/or operational costs for entities. In many cases, this can also lead to software errors, inconsistencies, and even incompatibilities.

Moreover, developing software applications generally require repeating a series of steps to translate business and/or process requirements into application functionality. In addition, the business and/or process requirements often change multiple times throughout the lifetime of the software application. And when the business and/or process requirements change, the various steps for translating such requirements into application functionality often need to be repeated. This can increase the amount of work and costs involved in maintaining and supporting software applications, can limit the scalability of the software applications, and can even introduce bugs throughout the lifetime of the software applications.

BRIEF DESCRIPTION OF THE DRAWINGS

In order to describe the manner in which the various advantages and features of the disclosure can be obtained, a more particular description of the principles described herein will be rendered by reference to specific embodiments thereof which are illustrated in the appended drawings. Understanding that these drawings depict only example embodiments of the disclosure and are not to be considered to limit its scope, the principles herein are described and explained with additional specificity and detail through the use of the drawings in which:

FIG. 5B is a diagram illustrating an example description of an endpoint action for creating a relationship between a person object and a phone number object, in accordance with some examples of the present disclosure;

DETAILED DESCRIPTION

Figure 1:
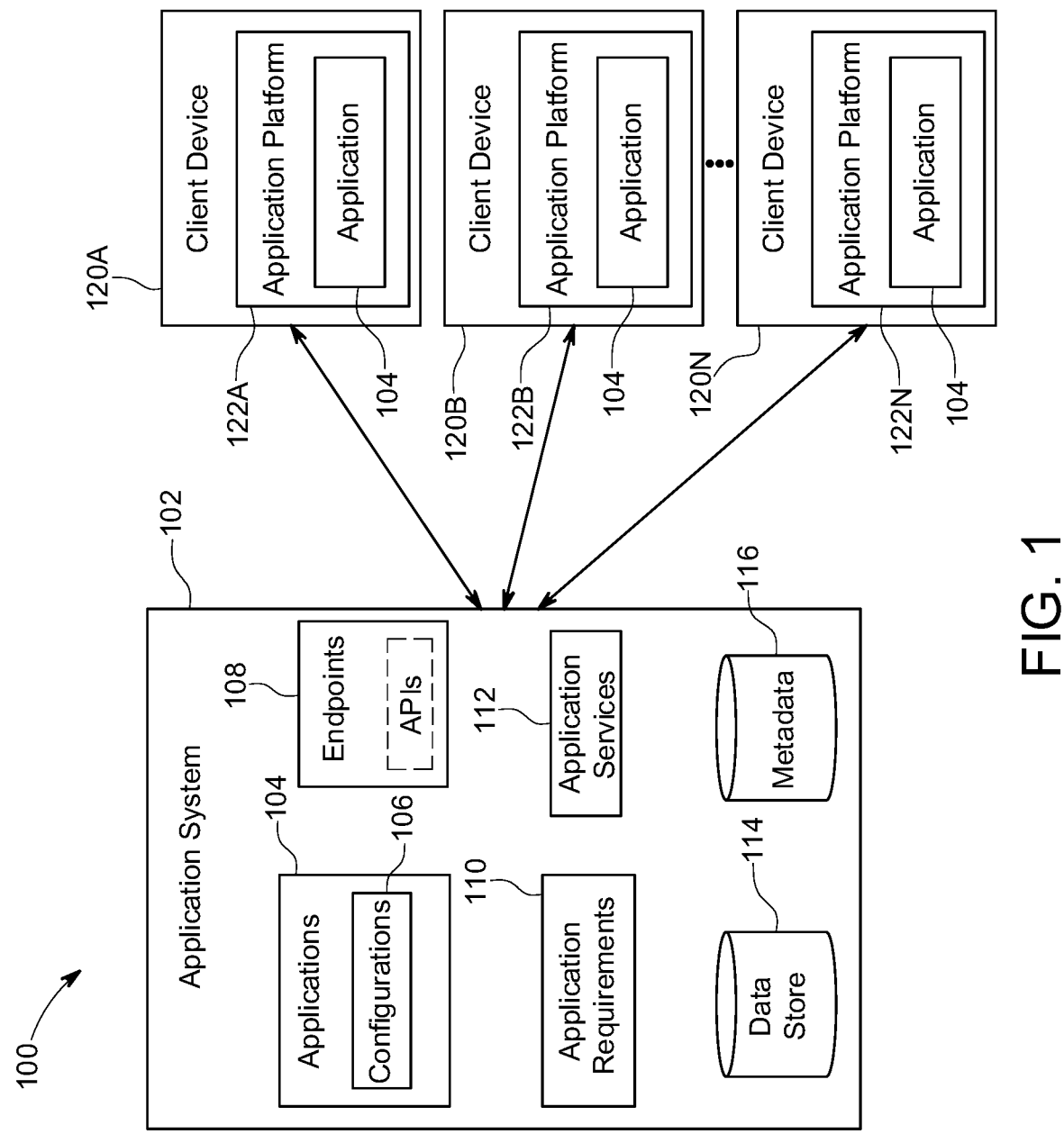
FIG. 1 is a block diagram illustrating an example configuration-driven application design, deployment and execution environment, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Businesses, governments, and other entities frequently utilize multiple types of computers and operating systems to conduct their business and daily activities. The heterogeneous computing environments commonly used by businesses, governments, and other entities typically necessitate multiple versions of the same software to be developed for the different computer and/or operating systems in the corresponding computing environment. This can create redundant development, design, and deployment work, increase resource and/or operational costs, and can often lead to software errors, inconsistencies, and even incompatibilities.

Moreover, developing software applications generally requires repetitive steps for translating business and/or process requirements into application functionality, which generally need to be repeated every time said requirements change. This can lead to increased amounts of work and costs involved in maintaining and supporting software applications, can limit the scalability of the software applications, and can even introduce bugs throughout the lifetime of the software applications. In addition, current approaches for adapting, developing, and implementing business logic in software applications are inflexible, costly and inefficient, typically requiring custom software code and functionalities to be developed and installed, which can incur time and operational costs.

Disclosed herein are systems, methods, and computer-readable storage media for efficient, flexible, scalable and easily customizable application design, development, customization and deployment strategies and platforms. In some examples, a configuration-driven application design, deployment and execution platform is provided. The configuration-driven application design, deployment and execution platform disclosed herein can reduce and/or eliminate redundant development, design, and deployment work needed to create multiple versions of the same software for the different computer and/or operating systems in heterogeneous computing environments. For example, in some cases, the configuration-driven application can be platform-agnostic, allowing the application to be configured once in a way that allows the application and associated configuration to operate in, and be supported by, different computing platforms and/or environments (e.g., hardware and/or software environments).

In some examples, the configuration-driven application design, deployment and execution platform disclosed herein can automate and/or eliminate repetitive steps typically performed to develop or translate often changing business and/or process requirements into an application functionality. Such automation can remove the "iteration penalty" or inefficiency of other approaches used to update an application functionality to match or support changing business and/or process requirements and can provide added flexibility, allowing the application functionality to change quickly, seamlessly and efficiently to meet the desired business and/or process requirements.

In some examples, the technologies disclosed herein can allow business and/or application logic to be implemented and/or adapted in an application without requiring new or custom code to be written/developed and/or installed for the application. For example, in some cases, the application can include rules described or captured in a configuration of the application, which can allow new and/or custom logic and/or interfaces to be quickly, seamlessly and efficiently implemented in the application without the need to write new or custom code for the particular logic and/or interface.

In some aspects, the disclosed technologies can decouple the application development process from the process for developing the software that exposes the application to users. For example, the configuration language for an application can be defined in a generalized and/or platform agnostic manner, which can allow software to interpret such configuration and present any application within the scope of the language. Thus, the defined configuration can be flexible and adaptable, as opposed to being limited to one single pre-defined application. This can significantly reduce the application development and implementation timeframe, cost, and efficiency. Moreover, as previously described, software development often requires rapid iterations across multiple platforms to support the needs of diverse clients with varying hardware and software needs. Accordingly, the ability of the disclosed technologies to support diverse environments and satisfy fast-pace development needs can provide significant advantages to clients.

The disclosed technologies can also reduce the complexity of supporting clients in disparate domains and industries, as the same software can present different applications for the disparate domains and industries, without requiring new code to be developed for a new client, domain, or industry. Instead, users can design new, domain-specific configurations representing new applications without enlisting software developers to write new or custom code. This can significantly improve the efficiency and feasibility of the software design and development process by removing entire steps.

Moreover, entities (e.g., organizations, businesses, agencies, etc.) within a same domain often have different operating, legal, or regulatory requirements. This can result in large amounts of engineering efforts expended in developing, synchronizing, and tracking the various requirements. In addition, such requirements often have to be duplicated across multiple platforms and languages, further increasing the complexity and reducing the efficiency of the software design and development process. Logic discrepancies across platforms can also create frequent and significant issues. In many cases, different software versions or entirely different software applications are adopted within the same entity to address different requirements of different groups within the entity, further exacerbating the increasing complexity and inefficiency of the entity's software development and deployment process and often limiting the ability to share data between groups. Advantageously, the technologies herein can address these and other challenges and limitations often experienced by entities.

Another challenge relating to data security is enabling systems that employ different access, permission, and other security rules to share data. Even a simple integration between two applications can require development teams to work together to share software documentation, such as application programming interface (API) documentation, and build custom software to ensure that data is handled securely and correctly by the applications. This problem is compounded when integrations span industries and difficult domains. For example, the finance and healthcare industries both deal with secure data, but have different rules and regulations for handling and protecting data. If a healthcare company wants to share data with a finance company, it is often very difficult to coordinate each party's requirements.

Advantageously, the disclosed technologies can define security information in a consistent manner, and the control information for data can be stored with the data. Consequently, any system attempting to share data can do so in a clearly-defined and secure manner which, in some examples, does not need to change based on the specific application configuration. In some cases, the definition of data objects and data models for an application can include attributes used to make access decisions and instructions on how to make such decisions. This can allow for more secure data sharing between services as such information can be automatically provided with the data itself.

FIG. 1 is a high-level diagram illustrating an example configuration-driven application design, deployment and execution environment 100. In this example, the environment 100 includes an application system 102 for designing and deploying applications 104 to client devices 120A through 120N (collectively "120"). The applications 104 can include any types of software applications for performing specific tasks or logic such as, for example, business logic, professional activities, personal tasks, etc. In some examples, the applications 104 can be domain-specific applications configured to provide functionalities and/or perform tasks, activities, logic, etc., for a specific domain. For example, the applications 104 can include software applications for police departments, hospitals, schools, municipalities, courts, universities, airports, service providers, transportation companies, government agencies, private companies, and/or any other type of domain (e.g., industry, entity, field, activity, context, use case, etc.).

The client devices 120 can be any electronic devices such as, for example and without limitation, a laptop or notebook computer, a server computer, a desktop computer, a tablet computer, a smart device (e.g., a smart television, a smart wearable device, etc.), an Internet-of-Things (IoT) device, a camera system (e.g., a digital camera, an IP camera, a video camera, a security camera, etc.), a telephone system (e.g., a smartphone, a cellular telephone, a conferencing system, etc.), a gaming console, a video streaming device, a drone, a computer in a car, an autonomous device or vehicle, and/or any other suitable electronic device(s). Moreover, the application system 102 can be part of, or implemented by, a computing device or multiple computing devices or systems. For example, the application system 102 can include a server computer, a datacenter, a node or component in a cloud computing environment (e.g., a compute node, a virtual machine (VM), a software container, cloud infrastructure resource(s), etc.), a laptop or notebook computer, a desktop computer, a tablet computer, a smart device, an IoT device, a database system, an endpoint node or device, and/or any other suitable electronic device(s). In some examples, the application system 102 can include one or more infrastructure nodes/resources and/or components in a network environment such as, for example, a cloud computing environment, a datacenter, etc.

The application system 102 can include applications 104 designed for, and/or deployed on, the client devices 120. In some examples, the applications 104 can be domain-specific applications, as previously noted. Moreover, the applications 104 can include configurations 106, which can be platform-agnostic to allow any of the applications 104 to be deployed, executed, and supported on any hardware and software environment, such as any operating system (OS), any executing environment, any type of device (e.g., any type of mobile device, desktop device, server device, etc.). Thus, the configurations 106 can allow the applications 104 to be deployed, executed, and supported on any of the client devices 120 regardless of the OS, executing environment, type, software, and/or hardware of the client devices 120. For example, the applications 104 can have configurations 106 that are defined in an agnostic manner that allows the software on any of the client devices 120 to interpret the configuration of any application and execute any application within the scope of the configuration.

In some examples, the configurations (e.g., 106) of an application (e.g., 104) can support multiple applications so a configuration can be developed once for multiple applications, as opposed to once for each specific application. Moreover, in some examples, the configurations of an application can allow the functionality and/or business logic of an application to be described in the application using rules that can be interpreted by the client devices 102 and which allow updates and/or functionalities of an application to be deployed and/or implemented without developing a new application each time or requiring new logic, software, and/or functionalities to be developed each time.

For example, clients within a same and/or different domain often have different operating, legal, and/or regulatory requirements. This can often require a large amount of engineering effort in developing, synchronizing, and tracking the applicable requirements for each application used by the client. In some cases, such requirements need to be duplicated across multiple platforms and languages. Logic discrepancies across platforms can also be a source of issues. Often different software versions or entirely different software applications are adopted within a same organization to address such requirements, which can create increasing costs, time and resources. In many cases, this can also limit or impact the ability of applications used by different groups to interact and/or share data. However, the configurations 106 of one or more applications (e.g., 102) can be defined in a manner that allow the one or more the applications to be supported in a variety of operating, legal, and/or regulatory contexts, and can be updated quickly to account for any requirement, changes, etc., without necessitating new software or applications to be developed.

Moreover, data security can often be a challenge in homogeneous environments, as it can be difficult to develop applications that can share data across multiple systems that may employ different access, permission, and/or other security rules. Even a simple integration between two applications can require development teams to work together to share application-programming interface (API) documentations and/or build custom software to ensure that data is handled securely and correctly. The problem can be compounded when integrations span industries and/or difficult or complex integration or deployment domains. For example, the finance and healthcare industries both deal with secure data, but are generally regulated by different rule sets or requirements. Thus, if a healthcare company wants to share data with a finance company, it may be difficult to coordinate each party's requirements.

However, with the configurations 106, security information can be defined in a consistent way, and control information for the data can be stored with the data itself. Consequently, any system attempting to share this data can do so in a defined and secure way that does not need to change based on the application configuration. In some examples, the configurations 106 can include definitions of data objects and data models that include the attributes for making access decisions, and can include instructions about how to make such decisions. This can allow for more secure data sharing between services, as this information can be automatically shared with the data itself.

A data object can refer to a software and/or programming object. In some examples, a data object can include a software collection of variables, attributes, attribute values, and/or methods. In some examples, a data object can include key and value pairs.

In some examples, the configurations 106 can support per-client modifications of applications 104 running on client devices 120, synchronization of changes across multiple platforms from one configuration, and the applications 104 can support new or updated logic and/or application requirements 110 (e.g., functional requirements, operational requirements, legal requirements, etc.), without requiring new or different software updates. In some examples, the configurations 106 can include platform-agnostic application definition language that can be interpreted at run time to define and/or redefine application content and presentation. This can enable updates to be implemented for one or more applications without software redeployment, without rebuilds, without restarts, with transparency, etc. This can also enable multiple applications to run without software changes, as a configuration can support multiple applications, and can prove consistency across multiple software installations and clients.

In some cases, the configurations 106 can include specific definitions of an application using the configuration language, which can be platform agnostic as previously explained. In some examples, the configurations 106 can include data objects, a data model(s) defining data objects and actions that can be taken on the data objects, state information (e.g., data object state including data object attribute values, relationships of a data object to any other data objects, etc.), an application context (e.g., state of data objects, the actor requesting an operation, the time and/or location of a request, the module requesting to perform an operation, a specific point in a series of state transitions, etc.), an application layout, one or more application modules, rules describing valid states in a context, actions (e.g., data object state transitions, layout transitions, initiation of external communications, etc.), workflows, permissions, and/or any other component/element as further described herein.

In some cases, the application system 102 can include, collect, and/or maintain application requirements 110 associated with the applications 104. The application requirements 110 can include, for example and without limitations, legal and/or regulatory requirements, business requirements, functional requirements, industry or domain-specific requirements, operational requirements, client requirements, data requirements, and/or any other requirements. In some examples, some or all of the application requirements 110 can be obtained from one or more different sources such as, for examples, the Internet, government agencies, industry standards, regulatory bodies, clients, subject matter experts, administrators, third-party agencies, data repositories, etc. The application requirements 110 can be used to design, develop, deploy, and/or manage the applications 104 in a way consistent with applicable requirements.

The application system 102 can include endpoints 108 which can provide and/or include interfaces, routes, and/or application programming interfaces (APIs) for the applications 104. In some examples, the endpoints 108 can allow objects associated with the applications 104 to be created, viewed, updated, deleted, inter-related, manipulated, etc. For example, the endpoints 108 can process requests to and/or from the client devices 120 to access, create, view, update, delete, etc., objects and data associated with the applications 104. In some cases, endpoint and/or API access can be stateless and authenticated by a token or other client-supplied data.

In some examples, the application system 102 can include one or more application services 112. In some examples, the application services 112 can include a trusted validator of the configurations 106. For example, the application services 112 can include a trusted validator of application layouts, application rules, application actions, data model instances, action execution, etc. In some examples, a data model instance can include specific or default attributes, relationships and/or actions of a data model, which can be defined in the application configurations 106. In some aspects, the structure of a data model can be dynamic and can differ from default parameters defined in the application configurations 106 based on the context and rules at the time of retrieval.

In some cases, the applications 104 can have one or more trust boundaries, which can include the physical and/or conceptual realm in which operations are trusted to be performed correctly. In some implementations, operations performed outside the trust boundary can be validated from within the trust boundary. In some cases, the trust boundary can define the boundary between the user facing implementation on the data store. Configuration descriptions can be followed inside of the trust boundary but, in some cases, can also be followed outside of the trust boundary.

In some examples, the application system 102 can include a data store 114 for storing data, including any data associated with the applications 104. In some cases, the data store 114 can include one or more storage devices and/or databases. For example, the data store 114 can include a single storage device and/or database and/or multiple storage devices and/or databases. In some examples, the data store 114 can include one or more storage resources or nodes implemented by a distributed storage system. Moreover, the data store 114 can store data associated with any of the components (e.g., 104-112) implemented by the application system 102. For example, the data store 114 can store data (e.g., objects, parameters, values, files, blocks, items, content, configurations, software, modules, rules, logic, etc.) associated with the applications 104, the configurations 106, the endpoints 108, the application requirements 110, the application services 112, etc.

In some examples, the application system 102 can include a metadata data store 116 for storing metadata associated with the applications 104. The metadata can include, for example and without limitation, state information, preferences, parameters, notifications, timestamps, logs, descriptive information, values, statistics, update information, status information, etc.

As previously mentioned, the client devices 120 can implement, interpret and run the applications 104 from any hardware and/or software environment. The client devices 120 can include application platforms 122A-N designed to implement, interpret and/or run the applications 104 from the client devices 120. In some examples, the application platforms 122A-N can represent platform-specific interpretations of the configurations 106 of the applications 104. Moreover, in some cases, the application platforms 122A-N can include software, software tools, software frameworks, and/or software packages for interpreting, implementing, executing, translating, integrating, and/or installing the applications 104 based on the configurations 106. For example, the application platforms 122A-N can include compilers, debuggers, APIs, libraries, and/or software tools for compiling, debugging, interpreting and executing the applications 104 on the client devices 120. In some examples, the software, software tools, software frameworks, and/or software packages associated with the application platforms 122 can be platform specific and/or designed to support one or more specific hardware and/or software environments associated with the client devices 120.

Figure 2:
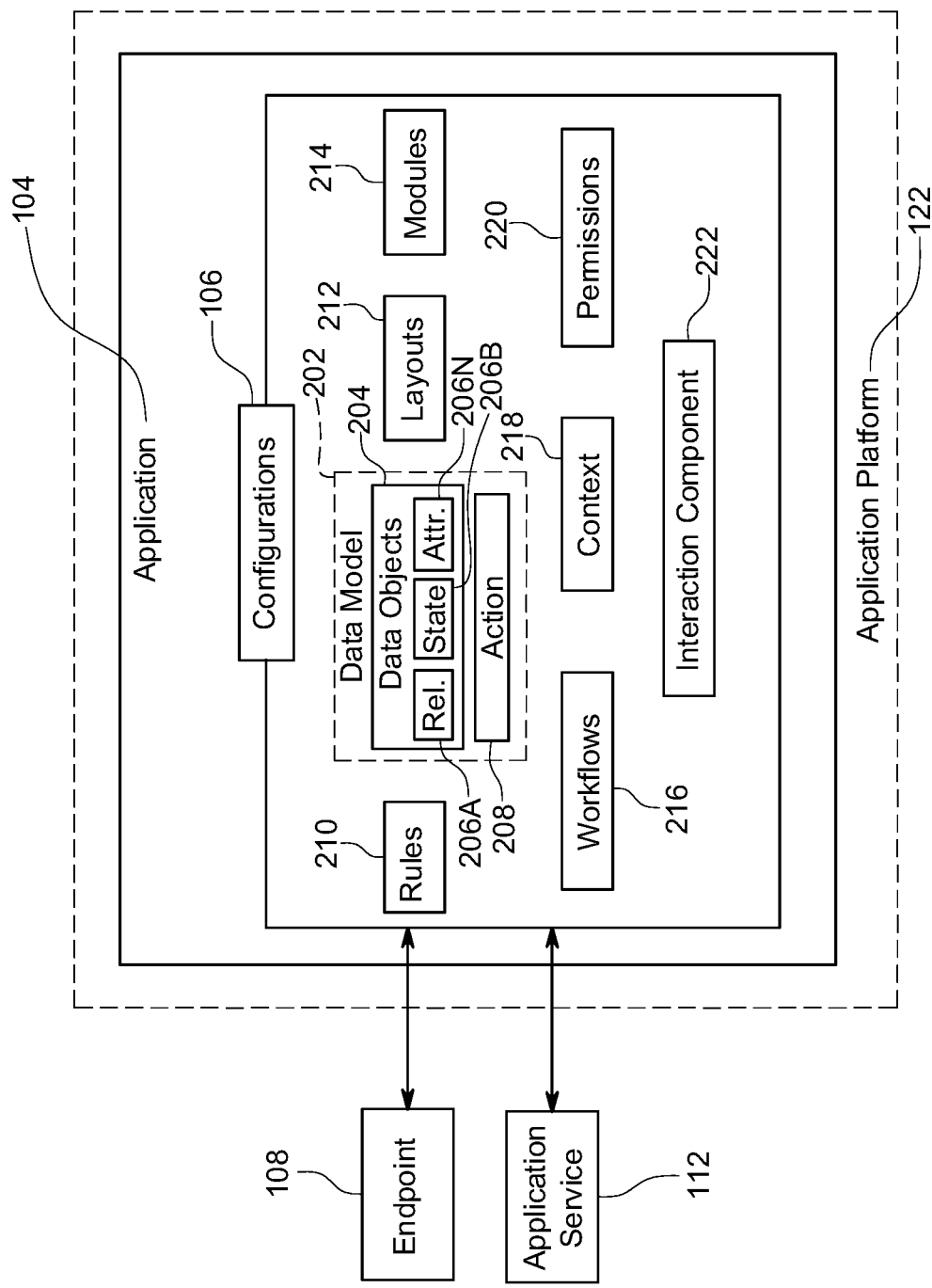
FIG. 2 is a high-level diagram illustrating an example application implemented by an application platform at a client device, in accordance with some examples of the present disclosure.

FIG. 2 is a high-level diagram illustrating an example application 104 implemented by an application platform 122 at a client device 120A, 120B, or 120N. In this example, the application 104 can include configurations 106 representing a high-level definition of the application 104 that can be implemented by the application platform 122. The configurations 106 can include a data model 202, rules 210, layouts 212, modules 214, workflows 216, a context 218, permissions 220, and an interpretation component 222.

The data model 202 can include data objects 204, which can include relationship data 206A, state information 206B, and attributes 206N. The relationship data 206A can define how a data object interacts with other data objects and/or one or more characteristics of a relationship between a data object and one or more other data objects. The state information 206B can include one or more properties of each data object. For example, the state information associated with a data object can include one or more data object attribute values, information about the relationship between the data object and one or more other data objects, one or more current data object values and/or states associated with the data object, etc. In some cases, the relationship data 206A can be part of the state information 206B. In other cases, the relationship data 206A can be partially or completely separate from the state information 206B.

The attributes 206N can include property values and/or parameters associated with the data objects 204. For example, an attribute associated with a data object can include a value associated with a specific parameter, field, condition, state, result, and/or characteristic of the data object.

In some examples, the data model 202 can also include actions 208 associated with the application 104. The actions 208 can include potential interactions (e.g., interaction values, states, conditions, rules, etc.) with data objects 204 and/or other components such as, for example, the layouts 212, the modules 214, etc. In some examples, the actions 208 can define data object state transitions, layout transitions, external communications, operations, etc.

The rules 210 can include instructions, conditions, and/or definitions indicating valid states, transitions, interactions, and/or processing conditions for data objects 204, layouts 212, transitions, state transformations, etc. In some examples, the rules 210 can describe possible state transformations for a data object and/or layout based on a particular context (e.g., 218). In some cases, rules 210 can be dynamically applied and/or implemented for a particular, data object, layout, and/or context. Moreover, in some examples, a state transformation can include a change, addition, or deletion of a property of a data object.

In some examples, a rule in the rules 210 can include a pre-condition that specifies one or more properties of a data object, one or more properties of one or more data objects related to the data object. The one or more properties can be defined for or associated with one or more specific positions or points in a transition or series of transitions. Moreover, a rule can include a post-condition that specifies valid states for object properties after a transition is applied. In some examples, post-conditions are considered for evaluation if an associated pre-condition matches or is satisfied. Conditions may contain pattern matching expressions to allow non-specific matching of objects. Conditions may also reference properties of the current evaluation context and other objects in a specified state. Defined transformations of rule elements may also be applied during a rule evaluation. State transition rules can include a level designation indicating the appropriate application response to a violation in a particular context.

The layouts 212 can describe how objects or groups of objects should be presented to the user or client device 120 in a given context. In some examples, the layouts 212 can include recursively embeddable "views" describing how objects or a grouping of objects should be presented to the user in a given context. In some cases, the layouts 212 can be expressed as a high-level mapping of implementations to concrete user controls for a given interface. The layouts 212 can be graphical/visual interactive, but need not be visual nor interactive. Layouts may embed additional layout representations based on valid state transitions.

In some examples, the layouts may apply rules to user input, and change their appearance/behavior accordingly. For example, once a user enters "United States" for "country", the layout may apply a rule, and remove all "state" options located outside the United States and its territories. The layouts 212 can provide different and/or tailored views/interfaces for different client platforms and/or surfaces such as, for example, a mobile platform (e.g., a mobile operating system and/or environment), a desktop platform (e.g., a desktop operating system and/or environment), a web platform (e.g., a browser-based environment), etc. While each platform/surface can provide the same and/or similar functionality for the application 104, they each can provide different and/or platform/surface specific views/interfaces and/or different presentation logic. In some examples, a device platform can efficiently collect and display information in a manner tailored or suited for that specific device platform.

The modules 214 can include software, logic, services, and/or components representing specific use cases or functionalities for data objects 204. In some cases, the modules 214 can include functions or functionality for specific tasks such as, for example, data collection tasks, data processing tasks, data analysis tasks, data export tasks, data and/or user interaction tasks, etc.

The workflows 216 can include rules, transition states, and/or flows associated with the data objects 204 and/or any other component of the application 104. In some cases, workflows 214 can be defined by evaluating rules in a given context on objects. Moreover, a workflow can reach a terminal state when there are no state transition rules that match the current object state for the current context. In some examples, workflow documents can be defined for generating specific rule sets.

The context 218 can include a data object's relation to other data objects, an actor requesting an operation associated with a data object, a time and/or location of a request, a module requested to perform an operation, a specified state transition and/or point in a series of state transitions being evaluated, and/or any other context, state, or status-related information.

The permissions 220 can include data about access, security, privileges, rule enforcement, and/or operations. In some examples, the permissions 220 can define operations that may be performed on a data object in a specific context. In some cases, the permissions 220 can be specified by a permission language specifying attribute-based access control policies. In some aspects, a permission language can be applied by a set of transforms on transition rules.

The interaction component 222 can include an object that describes at least part of the way a user or device can interact with the application 104 and/or associated data. In some examples, the interaction component 222 can define how a user and/or device can view, enter, modify, etc., data and/or navigating layouts.

In some examples, the application 104 can include or can interact with one or more endpoints 108 and/or application services 112, as previously described. In some cases, the endpoints 108 and/or application services 112 can be part of or implemented by the application 104 and/or the configurations. In other cases, the endpoints 108 and/or application services 112 can be implemented by the application system 102. In yet other cases, the endpoints 108 and/or application services 112 can be implemented by both the application system 102 and the application 104.

With the application platform 122, any device implementing the application platform 122 can have a full picture of the application 104 (e.g., the state of the application 104), such as the application's rules, requirements, access controls, layouts, configurations, etc. For example, in a client-server context, both the client (e.g., 120) and the server (e.g., application system 102) can have a complete picture of the application 104. Similarly, in a standalone implementation, the device implementing the application platform 122 can have a complete picture of the application 104. In some examples, this can allow a user at a client device to access the application 104 and its data and functionalities even if the client is offline or otherwise unable to communicate with the application system 102. The client device does not have to communicate with the application system 102 to run the application 104 and/or provide access to the data and/or functionalities of the application 104. user can still access/ manipulate data from the application 104 and perform any permitted actions while the client device used by the user is offline (e.g., unable to connect to a network and/or the application system 102). In some cases, as further explained herein, the client device can subsequently synchronize with the application system 102 when the client device is able to establish communications with the application system 102. The client device can provide the application system 102 any data and/or data updates from the time the client device was in disconnected mode (e.g., offline and/or otherwise unable to communicate with the application system 102).

Moreover, each device (e.g., the application system 102, each client device 120, etc.) can enforce rules, permissions, layouts, etc., and can validate data manipulated (e.g., added, edited, deleted, etc.) and/or actions performed at the device. For example, client device 120A (and/or the application platform 122 at the client device 120A) and the application system 102 can each enforce rules, permissions, layouts, etc., defined for the application 104 (e.g., based on the configurations 106) and validate any actions and/or data from the client device 120A (e.g., based on the configurations 106). In some cases, the client device 120A can (e.g., based on the configurations 106) prevent a user from (and/or can alert the user when) entering incorrect data in the application 104, accessing data and/or components restricted for that user (and/or all users), accessing an incorrect and/or prohibited application layout, and/or otherwise accessing/ manipulating data, components, layouts, etc., that are not permitted based on the configurations 106. In some cases, the client device 120A can validate (e.g., based on the configurations 104) any data from, and/or actions by, the user of the application 104 at the client device 120A.

The application system 102 can also validate any data and/or actions from a client device and prevent/reject any incorrect and/or prohibited data and/or actions from a client. Thus, if a user provides incorrect data to the application system 102 and/or a malicious user tampers with the application 104 to enable prohibited and/or incorrect actions/data at the client device, the application system 102 can prevent any incorrect and/or prohibited data from being applied/ accepted for the application 104.

In some examples, the application ecosystem (e.g., environment 100) can include a trust boundary at one or more locations, which can perform validity/assurance checks of any data and/or actions being implemented/applied (and/or requested to be implemented/applied). In some examples, trusted components can ensure the data has passed between components without modification.

A trust boundary can represent or define a boundary where the computer instructions can be verified as correctly implementing access controls and data integrity. For example, in some cases, a trust boundary can be established at a computer when the computer instructions implementing a rule(s), permission(s), access control(s), etc., associated with the application 104 can be validated and/or trusted to ensure the correct instructions are used to evaluate rules, permissions, user access controls, etc., and hacked/tampered or otherwise incorrect/modified instructions are not being used. In some examples, a trust boundary can include a device and/or component that is under the control of an entity associated with the environment 100, such as a provider and/or administrator of the application platform 122 and/or the application 104, which can ensure the state and/or trustworthiness of the device and/or component. In other examples, a trust boundary can include a device and/or component that implements a verifiably and/or reliably secure environment, such as a device that implements a trusted platform module (TPM) and/or any hardware-based and/or software-based security and/or encryption technology, such as a cryptoprocessor, a trusted/verified security application, etc.

For example, the application system 102 can be a trust boundary for any data and/or actions associated with the application platform 122, and can validate any data and/or actions prior to applying/propagating such data and/or actions. In some cases, a client device (and/or the application platform 122 at the client device) or one or more components at the client device (and/or one or more components of the application platform 122 at the client device) can also be or provide a trust boundary.

In some examples, any devices and/or components that are outside of a trust boundary (e.g., untrusted clients, untrusted client components, etc.) can submit across the trust boundary data that complies with the rules, permissions, requirements, etc., defined for the application 104. Devices and/or components inside a trust boundary, such as the application system 102 (and any other devices/components inside a trust boundary) can evaluate the rules, permissions, requirements, etc., defined for the application 104 and the user's access controls, and validate that they are consistent with the data submitted by the devices and/or components outside of the trust boundary. Note that, as previously explained, some implementations can include a single trust boundary or multiple trust boundaries. For example, the application system 102 can be the sole trust boundary in some cases. In other cases, trust boundaries can include the application system 102 and one or more other devices and/or components. Thus, the trust boundary can be in different locations depending on one or more factors such as, for example, the client's needs, the specific deployment structure, the type of application, legal and/or other requirements, preferences, etc. In some cases, the application system 102 can perform a validity/assurance check any time data is submitted by a client even if the client is inside a trust boundary.

Moreover, the trust boundary and the configurations 106 of the application 104 can allow enforcement of rules and validation of data and actions at different levels and/or different parts of a deployment. For example, in some cases, rather than relying solely on enforcement and validation at the application system 102 when data is submitted by a client, the technologies disclosed herein can allow checks at other locations and times. Thus, if a user enters incorrect/invalid data and/or performs an incorrect/restricted action, such improper data/action can be identified (and/or rejected or corrected) earlier in the process (e.g., prior to submitting the data to the application system 102). The user does not have to wait until the data is submitted to the application system 102 to know (or be informed) of any invalid/incorrect data, and can address any issues with incorrect/invalid data/actions before the data is submitted to the application system 102 and/or before additional data is entered and/or additional actions are performed. This can save the user time, can help the user identify an error (e.g., incorrect/invalid data/actions) without having to spend significant time troubleshooting the problem or tracing back previous steps, and can prevent cumulative errors that could potentially occur as a result of data dependencies and/or multiple actions performed after entering incorrect/invalid data.

In some aspects, data object relations can be maintained across one or more transformation series and/or can be searchable by individual object properties as well as multi-faceted relations discovered between objects. Relational discovery can be explicit or implicit based on data facets discovered to be similar and/or have a similar or same relation distance to other objects. In some cases, a data object can include multiple object instances. Moreover, different instances of an object can be correlated and can maintain a relationship. For example, a person object can include multiple object instances that are related, correspond to a same individual, but live independently of each other. The different object instances can be used to store/maintain different data for a person at one or more periods of time. In some cases, the different object instances can be used to maintain and/or track different data for the person at one or more times.

For example, assume for illustration purposes that the application 104 is a law enforcement application that includes person objects for law enforcement individuals, witnesses, victims of crimes, individuals charged with and/or convicted of crimes ("charged individuals"), and experts. In a criminal matter, rules preventing modifications to data in a court record may prohibit modification of data of a person object. For example, data associated with a person object of a charged individual may not be modified. However, if new or additional data associated with the charged individual is collected, such data can be maintained in a second object instance of the charged individual and correlated to the person object of the charged individual (and/or an instance thereof) to allow such data to be added and correlated without modifying the person object of the charged individual (and/or an instance of the charged individual that cannot be modified).

As another example, if the charged individual is part of an ongoing investigation, additional object instances of the charged individual's person object can be created and correlated with the charged individual's person object (and any instances thereof) to add information collected during the ongoing investigation without modifying data of the charged individual's person object (or any instances thereof) that cannot be modified when such data is obtained. As yet another example, different instances of the charged individual's object can be created to store corresponding information for/from different times/stages, or if the charged individual is also a witness, victim, or has any other role/relationship to a case, investigation, etc., in order to separately maintain data (and correlate the data) for that individual as the charged individual and the witness, victim, etc. This way, multiple, correlated instances of data can be maintained for an entity (e.g., the person) and managed/changed independent of each other.

The previous example is merely an illustrative example provided for explanation purposes. One of ordinary skill in the art will recognize from the disclosure that multiple object instances can be implemented for different types of applications (e.g., law enforcement, fitness, legal, financial, business, education, research, etc.), different types of objects (e.g., person objects, location objects, contact information objects, address objects, device objects, etc.), different types of entities (e.g., people, organizations, agencies, municipalities, groups, businesses, etc.), and so forth.

In some examples, auditing support can be performed for the application 104. For example, each state transition can be recorded along with the context and/or actor of the transition. Moreover, a transition series can be queried to determine the complete history of an object. For example, objects in an application can provide snapshots in time of a state of the object. In some cases, objects can provide and/or track a history of specific objects and/or describe how such objects have evolved from one point to another. The historical snapshots can allow a user to search, query, and/or navigate data for an object across different periods of time, different states, different stages, etc. The relationships between objects and/or instances of objects can enable a user to search, query, and/or navigate related data and/or versions of an object/entity across time, instances/versions, attributes (e.g., locations, addresses, roles/titles, names, phone numbers, details, etc.), and/or one or more dimensions or axes of data or objects.

For example, different instances of an object of a vehicle can be created and maintained with data about the vehicle at different times. The different instances can be correlated. During an investigation involving the vehicle, data from the different instances of the vehicle object can be searched and navigated to track a history of the vehicle and/or identify any relationships in the data associated with the vehicle. To illustrate, the data from the different instances of the vehicle object can be searched and accessed to identify who owned the vehicle when, accidents involving the vehicle, crimes involving the vehicle, and/or identify and/or correlate any other details about the vehicle across time.

The different objects can maintain one or more dimensions of information and relationships to other objects and/or entities. This can allow better tracking and correlation of related and relevant information across time, objects, entities, dimensions, etc. For example, with reference to FIG. 8B, objects 822, 824 can be associated to an entity 820. Such association can allow the application platform to know that two or more distinct objects (e.g., objects 822, 824), which can change independently of each other, represent the same thing (e.g., entity 820).

For example, assume an application tracks details about a person using multiple person object instances. Each person object instance can be changed independent of each other. Each object can have a persistent system wide unique identifier (also referred to as "QUIN" herein). For a first entry associated with a person named John, a person object 822 can be created with John's details. The person object 822 in this example is created with the QUIN "9999" and associated to entity 820 with QUIN "4545". The person object 822 with QUIN "9999" is a version of entity 820 with QUIN "4545". For a next entry, a new person object, object 824, is created including different details for John than person object 822 with the QUIN "9999". The new person object 824 created has QUIN "1212" and is associated to entity 820 with QUIN "4545". Both person object 822 with QUIN "9999" and person object 824 with QUIN "1212" are versions of entity 820 with QUIN "4545". Both person objects can represent the entity "John" in the system.

Figure 8A:
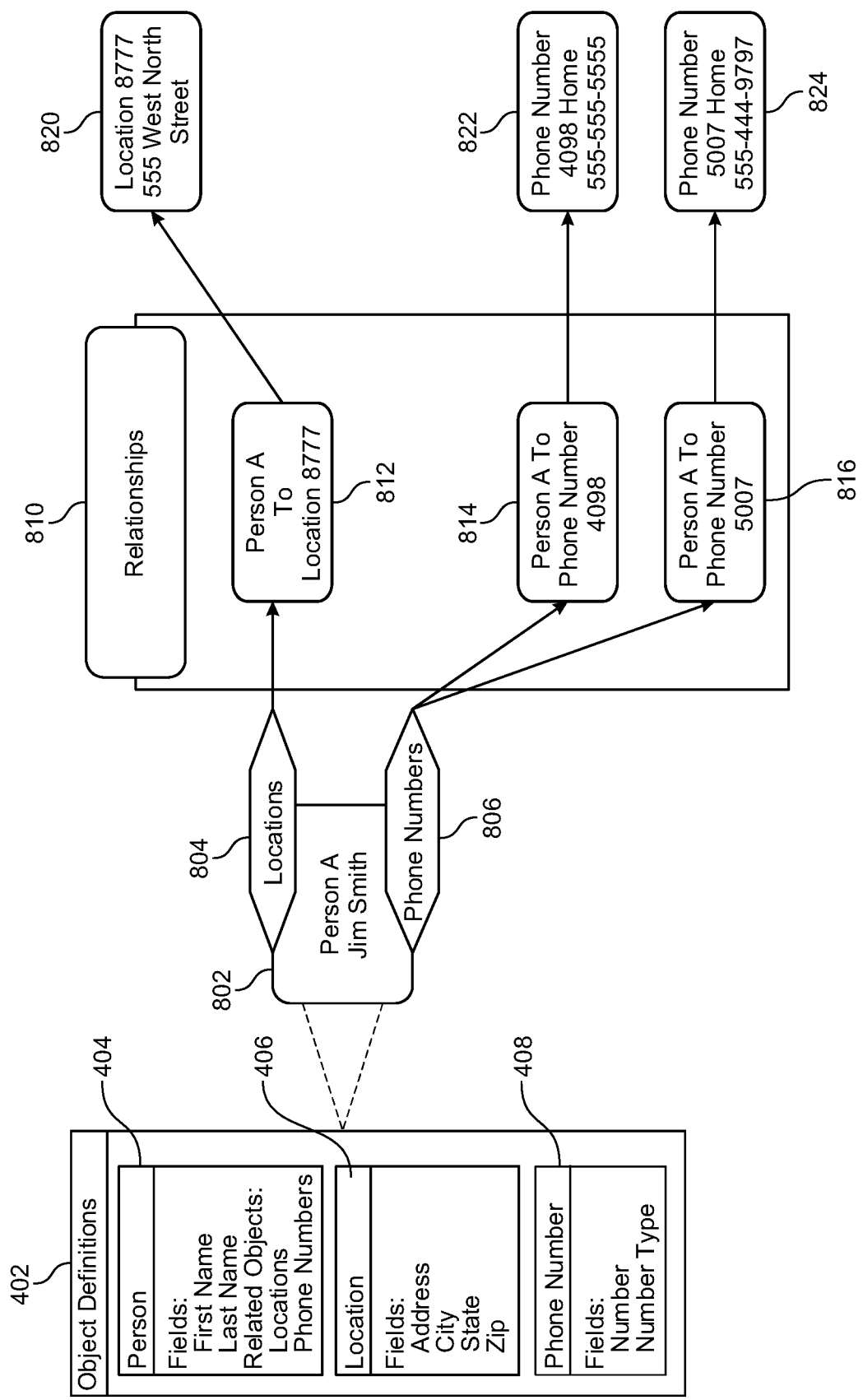
FIG. 8A is a diagram illustrating example object relationships, in accordance with some examples of the present disclosure.
Figure 8B:
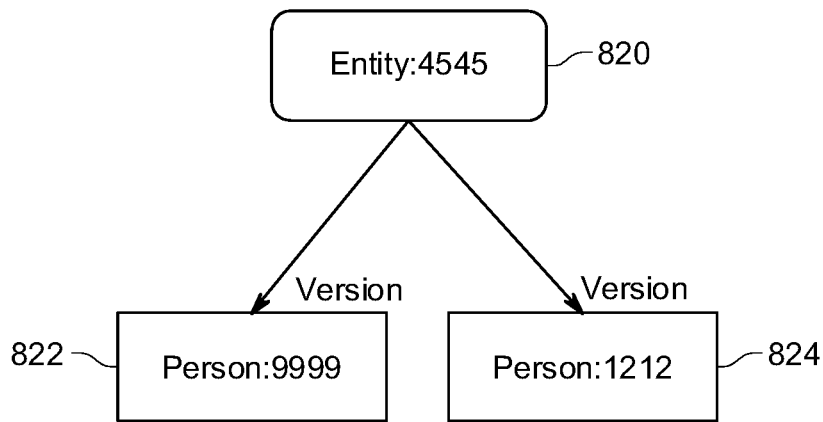
FIG. 8B is a diagram illustrating an example of an association between an entity and different object instances, in accordance with some examples of the present disclosure.
Figure 8C:
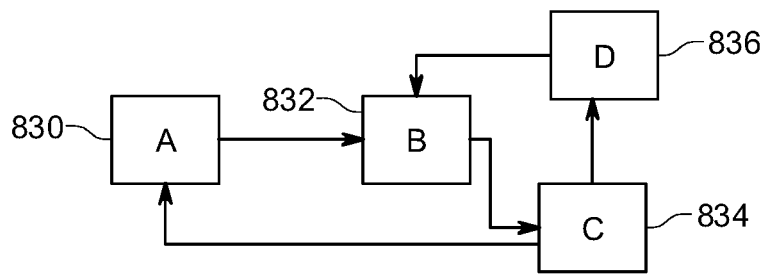
FIG. 8C is a diagram illustrating an example of different dimensions of data available for objects, in accordance with some examples of the present disclosure.

With reference to FIG. 8C, objects can have multiple dimensions (or axes) of information available. For example, objects 830 through 834 can have historical data, which can include a history of data changes on each object, object relationships (e.g., relationships to and/or from objects), entity associations allowing each object to be correlated to its entity and therefore other instances/versions of the object, etc. In FIG. 8C, object 830 has a link to object 832 and has a reference from object 834. Object 832 has a link to object 834, and a reference from object 830 and object 836. Object 834 has a link to object 830, a link to object 836, and a reference from object 832. Object 836 has a link to object 832 and a reference from object 834.

Figure 8D:
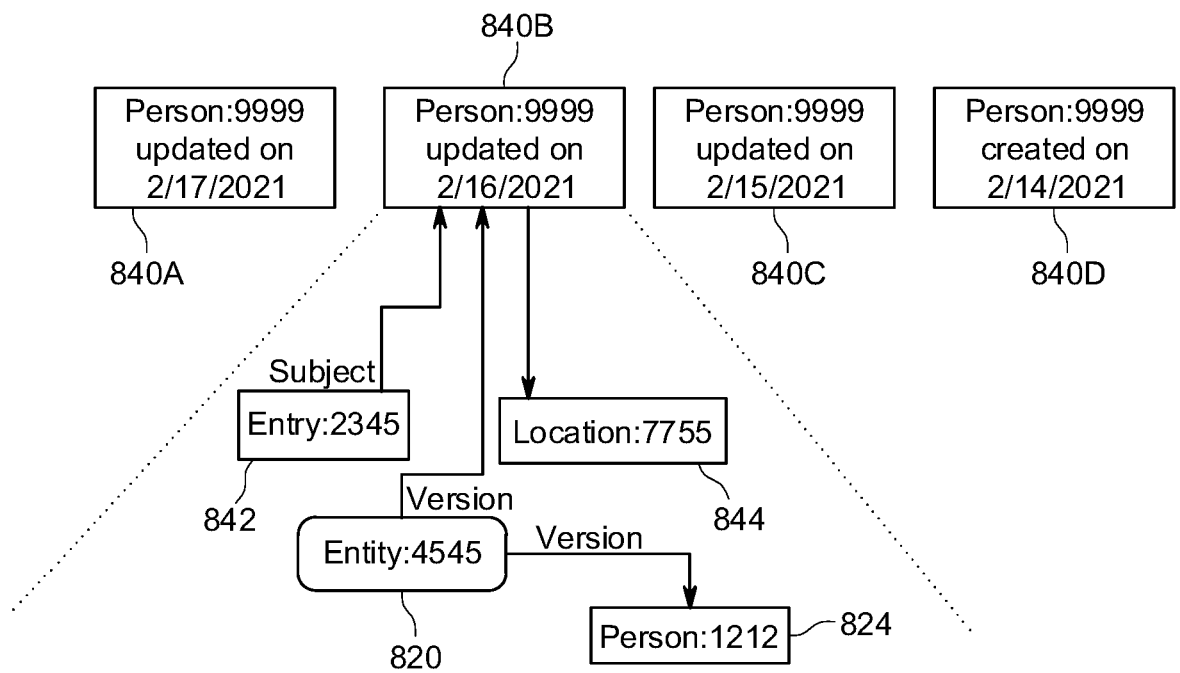
FIG. 8D is a diagram illustrating example relationships of object instances across time, in accordance with some examples of the present disclosure.

The different relationships and object instances can allow data associated with an entity and object to be tracked, searched, accessed, correlated, etc., across time, versions, etc. For example, as shown in FIG. 8D, person object 822 with QUIN "9999", which is associated with entity 820 and person object 824, was created on 2/14/2021 as reflected in object instance 840A, and updated 3 times from 2/15/2021 to 2/17/2021 as reflected in object instances 840B, 840C, and 840D. For each version of the person object 822 (e.g., object instances 840A, 840B, 840C, and 840D), the data of that version of the person object 822 can be searched and/or accessed, their relationships identified, and the entity (e.g., entity 820) of the object 822 can be identified.

Object instance 840B depicts a version or snapshot of the person object 822 at a particular point in time. As shown, at that particular point in time, object instance 840B has a relationship from object instance 840B (person "9999") to location object 844 (location "7755"), which tracks a location associated with the person, such as the location the person lives or was engaged in an activity. There is also a relationship from entry 842 (entry "2345") to the entry's subject, object instance 840B (person "9999"). Object instance 840B (person "9999") also has a relationship reference from entity 820 (entity "4545"). From entity 820, there is also a different version, which is shown as person object 824 (person "1212") in this example. This example was described with respect to person object 822 (and object instances 840A, 840B, 840C, and 840D associated with person object 822). However, one of ordinary skill in the art will recognize that any other objects can similarly have different versions, relationships, references, etc. This example is merely one illustrative example provided for explanation purposes.

Since objects have entities, then location object 844 (location "7755") can also have an entity. With this mechanism, it would be possible to ask the question what other people have used that location "7755". Location "7755" would have an entity that has versions which have relationships to person objects.

Returning to FIG. 2, in some aspects, offline support can be provided for the application 104, as previously explained. For example, schemas and rules known to the endpoint 108 can be transmitted to select client devices enabling them to apply the transition rules locally and progress through workflows without connectivity to the endpoint. Client devices may then submit (e.g., via an API) a series of transitions when connectivity is re-established. Object versioning via pre-conditions and transition series merging can also be used to detect and resolve conflicts when an object has been modified by multiple actors over the same period of time.

The design of the configurations 106 and/or applications 104 can provide an abstraction of what it means to be a piece of software. In some examples, a configuration may not create a program in the sense of something executable on a machine. Instead, a configuration can create an abstract definition of the program that will work on any computer if that computer has an engine (e.g., application platform 122) to interpret the definition. The configurations can be built to an in-house or client standard that abstracts application design. The resulting files may utilize new or existing standards such as JSON and XML, but the form and substance of the information can have a specific application building process. Moreover, system-specific platforms (e.g., application platforms 122) can run these configurations and can be custom built to understand the language of possible configurations.

In some examples, users can easily deploy and/or tailor applications 104 and/or associated application configurations (and/or any other aspect of an application) on their devices. For example, rather than installing multiple applications on a client device to access multiple application interfaces, data, and/or functionalities, a user can login to an application using different user identifiers (or any other identifier and/or login credential) to access the multiple customized applications, which can be dynamically generated and/or rendered based on application configurations and rules as further described herein. For example, when the user logs into the application 104, the application 104 can read application configurations at the client device and apply specific rules to dynamically render a customized application, interface, views, and/or application elements.

To illustrate, a user can enter a configuration for an application into the system to generate and/or update a model for the application. A non-limiting example model is provided below for illustration purposes.

The example model can include a person object as follows:

```
{
  "person": {
    Firstname:{
    "type":"string",
    "required":"True"
```

```
        "length": 60
    },
    "DOB":{
        "type": "date"
    }
    }
    }
}
```

The example model can include a layout (or view) as follows:

```
{
"context" : "person",
"panel":[{
"componentType": "textbox",
"field":"Firstname"
"Heading": "Enter Your Name"
},
{
"componentType": "datePicker",
"field":"DOB"
"Heading": "Date of Birth"
}]
}
```

When the application system 102 is initialized for the first time, the application system 102 can create data structures, such as tables with columns. For example, in some cases, the application system 102 can create a person object based on an object definition as shown in the illustrative example below:
Person
|id (int)|Firstname (varchar 60)|DOB (TIMESTAMP)
The application system 102 can then initialize API endpoints. For example, in some cases, the application system 102 can initialize API endpoints as follows:
/configuration (get)
/person (get, post, patch, put, delete)
At this point, the application system 102 is ready to receive requests. When a client logs into the system, the client can request that the application system 102 send a configuration(s) stored at the application system 102. The client can request the configuration through the API endpoint. The application system 102 can send the compiled configuration requested to the client. A non-limiting, illustrative example is provided below:

```
"object":
{
"person": {
Firstname:{
"type":"string",
"required":"True"
"length": 60
},
"DOB":{
"type": "date"
}
}
},
"views":{"personView":{
"context" : "person",
"panel":[{
"componentType": "textbox",
"field":"Firstname"
"Heading": "Enter Your Name"
},
{
"componentType": "datePicker",
```

```
"field":"DOB"
"Heading": "Date of Birth"
},
{
"componentType": "button",
"action": "submit",
"object": "person",
"targetView": "personView"
}
]
}}
```

Once the client has received its data, the client can generate and render a layout (e.g., a view) to the user. A non-limiting, example of a mobile layout is illustrated in FIG. 12B and further described below with respect to FIG. 12B.

At this point, the user can access, enter, and/or submit data. The client and the application system 102 can use the configuration schema to exchange communications over an interface, such as an API. For example, assume the user's name is John and his date of birth is 1/1/1980. An example API can be as follows:

```
POST /person
"person":{
"Firstname": "John",
"DOB": "1/1/1980"}
```

In some examples, if this request does not match the configuration, the application system 102 can reject the request. If the data is determined to be correct, the application system 102 can save the data to the database and respond with a created person as follows:

```
"person": {
"id": "5000"
"Firstname": "John",
"DOB": "1/1/1980"}
```

This high-level, illustrative example shows how, from a small amount of configuration, a user can produce a simple application. If the client wants a new field, such as a last name field (e.g., Lastname), such a field can quickly be added to the person object as follows:

```
"person": {
"Firstname":{
"type":"string",
"required":"True"
"length": 60
},
Lastname:{
"type":"string",
"length": 60
},
"DOB":{
"type": "date"
}
}
}
```

Once this configuration change is made, the application system 102 can perform a soft reload of the configuration data, and alter the person data structure (e.g., table) as follows:

Person

|id (int)|Firstname (varchar 60)|Lastname (varchar 60)|DOB (TIMESTAMP)

The application system 102 can update its endpoints and data schema as well. In some examples, part of the response header can include a configuration version in the 'Server' header. In this case, the client can see, for example, "Server": "exampleApplication/personDemo/.02". Since the version on this example schema would be higher than the version of the schema stored at the client, the client would access and/or obtain the configuration on the server endpoint to service the request. This illustrates an example of an in-place application update.

As further illustrated herein, the technologies disclosed herein can allow applications to be generated and/or updated quickly and without having to obtain and/or store large amounts of data or perform full and/or separate application installations. Moreover, the technologies herein can significantly increase efficiency in designing, customizing, and deploying applications; reduce the amount of data used to customize and deploy applications; simplify customization and deployment of applications; and enable substantial flexibility and customization in applications.

In some examples, a small amount of configuration data, rules, and/or permissions can be used to dynamically generate and/or update customized applications, rather than performing separate, full application installations for each customized application and/or application version. In some examples, an application can be updated, customized and/or deployed using data cached at the client (e.g., configurations, rules, permissions, and/or other data) and a delta between current application data and new application data.

Figure 3:
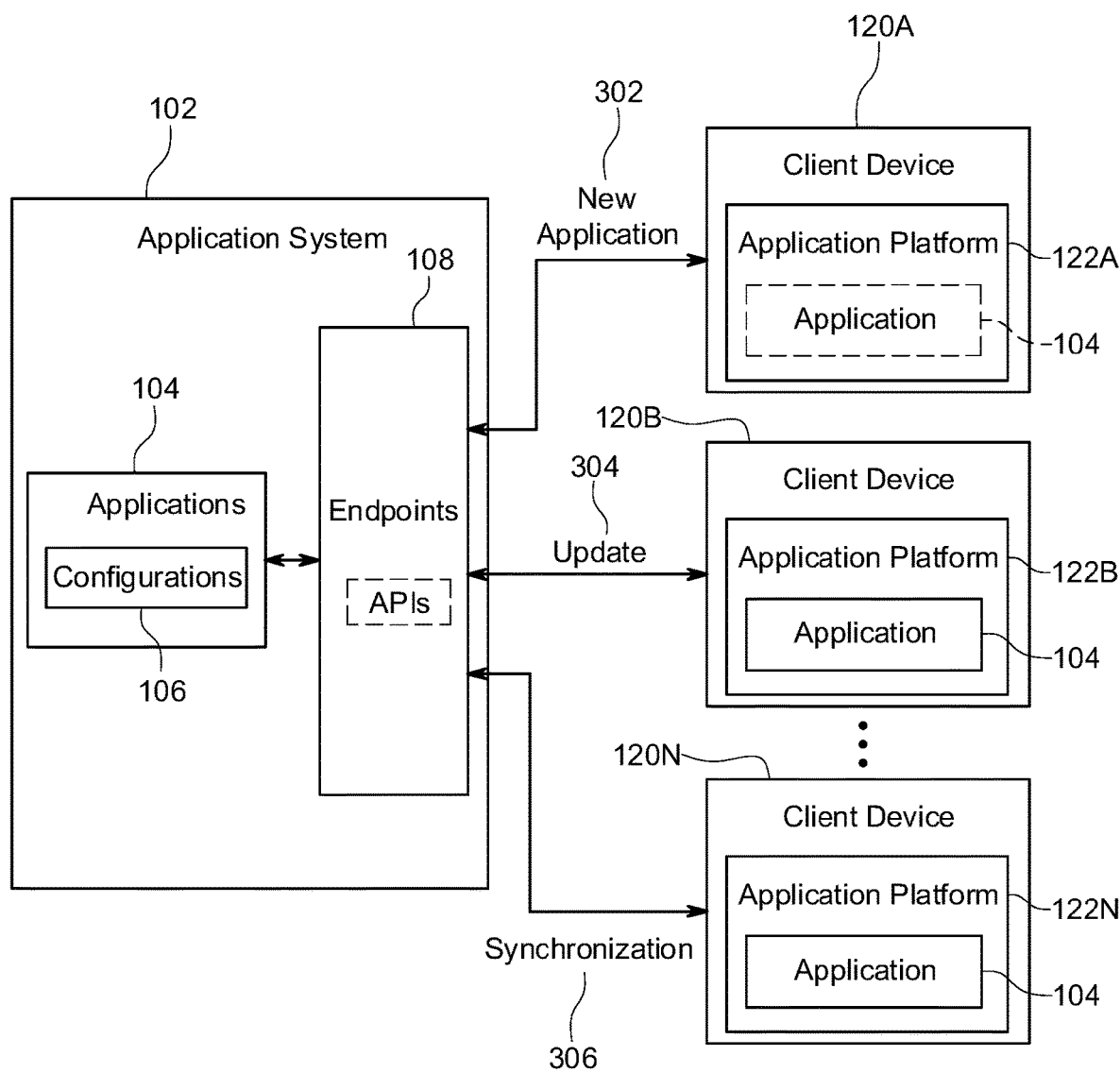
FIG. 3 is a high-level diagram illustrating example interactions between an application system and applications on client devices, in accordance with some examples of the present disclosure.

FIG. 3 is a high-level diagram illustrating example interactions between the application system 102 and the applications 104 on the client devices 120. In this example, the endpoints 108 on the application system 102 can communicate with the client devices 120 to deploy new applications, update current applications, and/or synchronize application and/or configuration changes from one application (and/or device) to other applications (and/or devices).

For example, to deploy an application 104 on client device 120A, the application system 102 can transmit a new application message 302 to the client device 120A. The new application message 302 can include configurations 106, which the application platform 122A on the client device 120A can interpret and execute the configurations in the new application message 302 to implement and run the application 104 on the client device 120A. In some examples, while the application platform 122A can be platform specific and the application 104 can be domain specific, the configurations 106 can be general so as to be interpretable and/or executable by different application platforms, and/or can be used to implement one or more different domain specific applications.

Moreover, to update an application 104 (e.g., application requirements, application logic, etc.) on client device 120B, the application system 102 can transmit an update 304 to the client device 120B. The update 304 can include updated configuration information, which the application platform 122B on the client device 120B can interpret and execute the update 304 to update the application 104 on the client device 120B. In some examples, update 304 can allow various aspects of the application 104, such as requirements or functionalities, to be updated without developing or implementing new software or code to deploy such updates.

To synchronize changes to an application 104 on client device 120N, the application system 102 can transmit a synchronization message 306 to the client device 120N. The synchronization message 306 can include changes made to the application 104 by the application system 102 and/or another client device running the application 104. The application platform 122N on the client device 120N can interpret and execute the synchronization message 306 to synchronize data and/or configurations of the application 104 on the client device 120N based on changes made by one or more other devices.

In some examples, while the application platforms 122A, 122B, and/or 122N can be platform specific and the applications 104 on any of the client devices 120 can be domain specific, the configurations 106 associated with the applications 104 can be general so as to be interpretable and/or executable by different application platforms (e.g., 122A, 122B, and/or 122N), and/or can be used to implement one or more different domain specific applications.

In some aspects, the endpoints 108 can transmit object schemas, rules, layouts, data objects, etc., to the client devices 120 if requested, needed, and/or used for nonconforming and/or other data objects.

In some examples, per-client deployments of new applications (e.g., 302) and/or per-client modifications (e.g., 304) and/or synchronizations (e.g., 306) of running applications can include different rules that are implemented and/or need to be applied by a client-specific application, changes that need to be synchronized across multiple platforms from one configuration, incremental updates of applications on different client devices and/or application platforms, and/or same application deployments across different client devices and/or application platforms.

Figure 4:
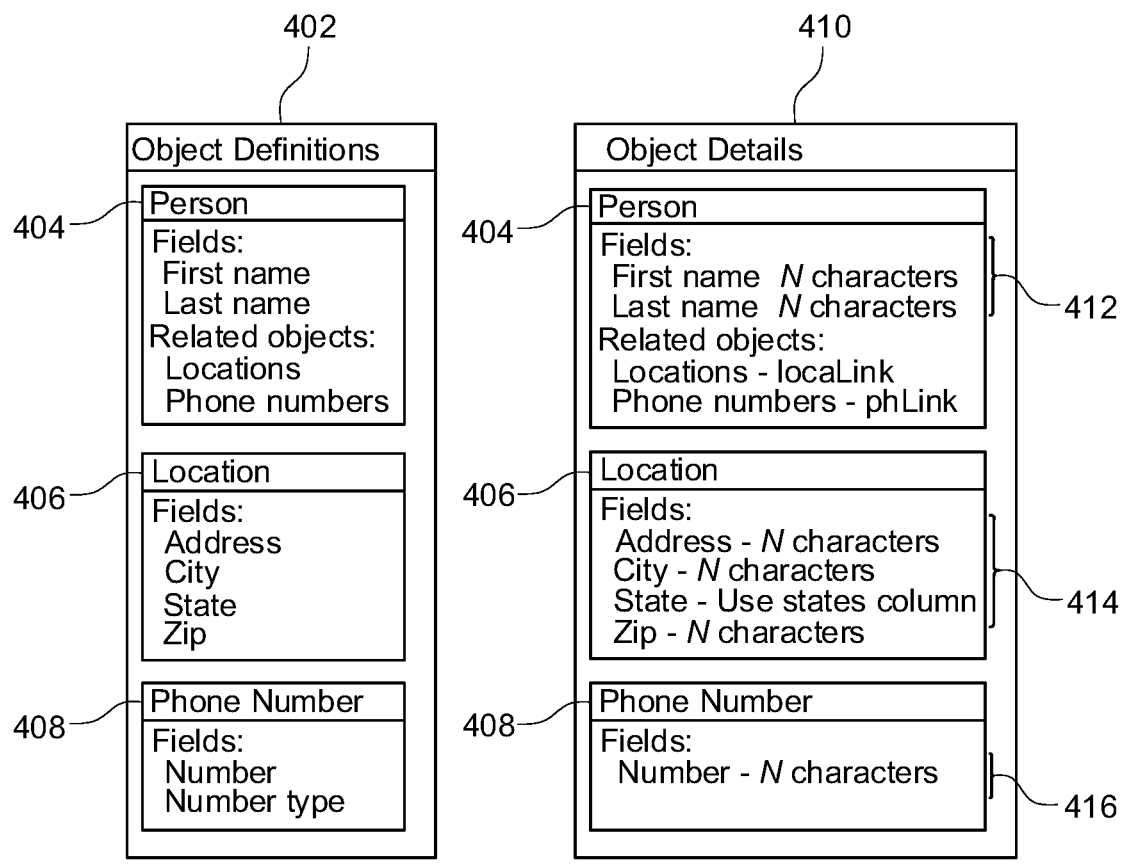
FIG. 4 is a diagram illustrating an example application configuration, in accordance with some examples of the present disclosure.
Figure 4:
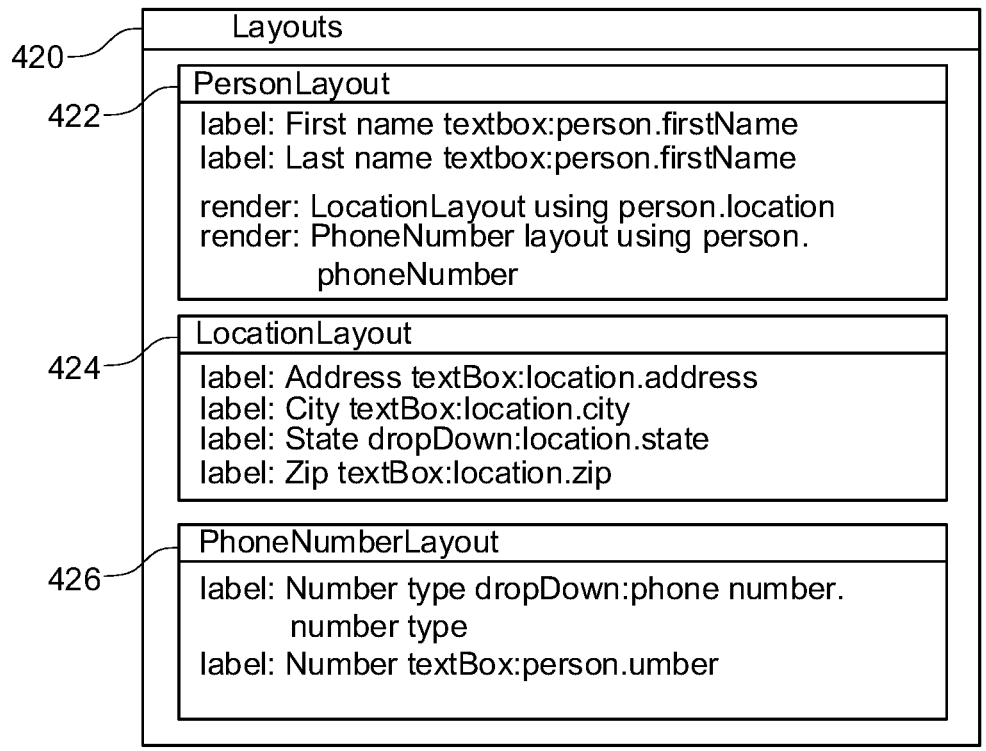
Figure 4:
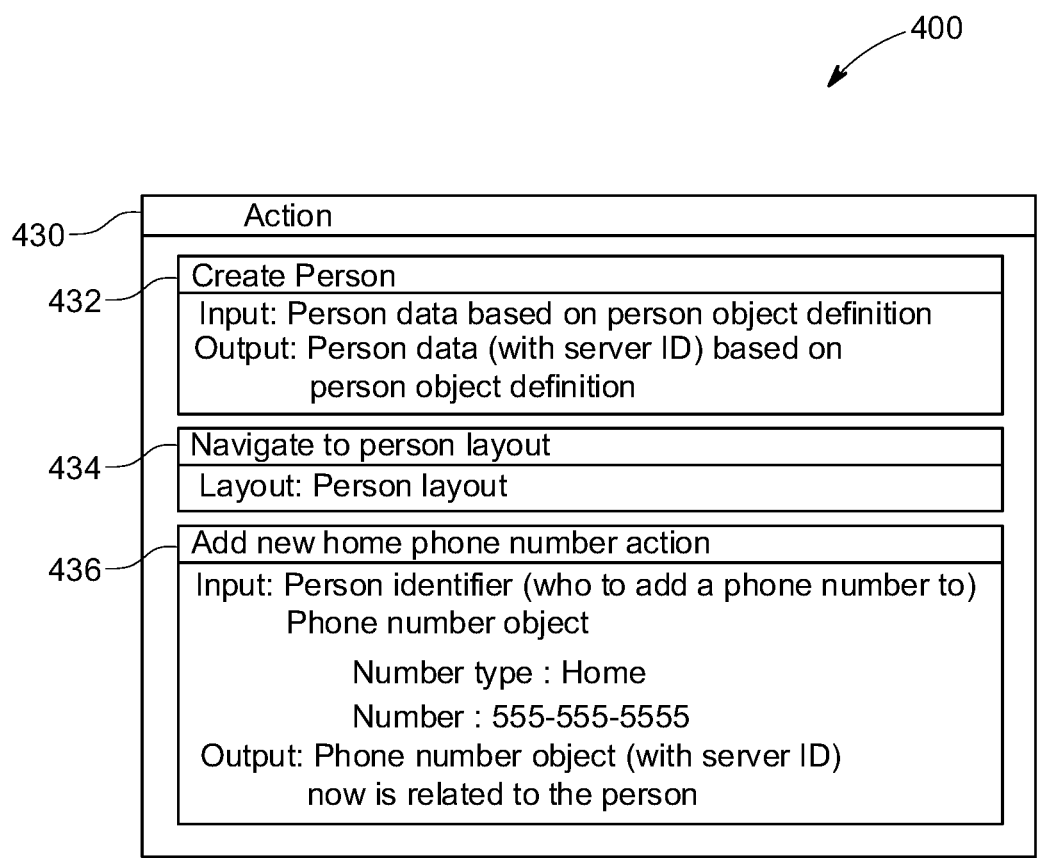

FIG. 4 is a diagram illustrating an example application configuration 400 in accordance with some examples. The application configuration 400 can be part of or separate from the configurations 106 shown in FIGS. 1 through 3. In some cases, the application configuration 400 can illustrate an example of the configurations 106 shown in FIGS. 1 through 3.

The application configuration 400 can include a collection of configuration components describing the application. In the illustrative example shown in FIG. 4, the application configuration 400 includes object definitions 402, object details 410, layouts 420, and actions 430. In some examples, the application configuration 400 can include other configuration items (e.g., as part of the object definitions 402, object details 410, layouts 420, and/or actions 430 and/or as separate components) such as, for example and without limitation, rules, object relationships, permissions, workflows, modules, routes, among others.

In some cases, the application configuration 400 can drive the user interface of the application, the data associated with the application (e.g., data provided by and/or accessible via the application), the actions a user can take through the application, how data is communicated between devices (e.g., between the application system 102 and the client devices 120), how the backend (e.g., the application system 102) processes the data (e.g., how the backend persists data, communicates data, stores data, manipulates data, etc.), etc.

In some examples, when generating the application configuration 400, an application configuration assembly process can validate and combine a source configuration and configuration details from a user such as, for example, an application designer or developer, a subject matter expert, etc. The application configuration assembly process can shape and/or modify the source configuration and/or add additional configurations to facilitate and/or enable processing of objects and/or data associated with the application. In some examples, the application configuration assembly can generate new configurations from the source configuration. For example, the application configuration assembly can generate an API from the source configuration.

The application configuration 400 depicted in FIG. 4 represents an application configuration assembly generated from a source configuration for a contacts management application. However, it should be noted that the application configuration 400 is merely an illustrative example provided for explanation purposes. In other examples, the application configuration 400 can include more or less components than shown in FIG. 4 and/or can correspond to other types of applications, as further explained herein.

The object definitions 402 can describe the data used for the application logic and/or functionality and used for validation of data in client and server communications. For example, the object definitions 402 can include fields representing the data of an object. In some examples, the object definitions 402 can include related objects representing relationships between an object and other objects. As shown, the object definitions 402 include objects 404, 406, and 408. Object 404 represents a person object, object 406 represents a location object, and object 408 represents a phone number object. Objects 404, 406, and 408 include respective fields corresponding to the data of each respective object. Object 404 also includes related objects having a relationship with object 404. In some examples, the fields in objects can include properties, attributes, types, etc.

The object details 410 can provide additional configurations describing the objects 404, 406, and 408. For example, in some cases, the object details 410 can define additional information about one or more object fields, object relationships, and/or any other item in the object definitions 402. The object details 410 can help define how various operations related to a particular object are performed. For example, the object details 410 can help drive the generation of APIs, persistence of data, caching logic, custom processing for a particular object type, etc.

The layouts 420 (or views) can provide a description of the application's user interface. In some examples, the layouts 420 can include information used to generate, render, update, and/or manage the user interface of the application. The layouts 420 can use actions 430 and other information such as rules, to define the application flow. For example, the layouts 420 can use navigation actions to change and/or update a current layout, endpoint actions to define interactions with the backend (e.g., application system 102), rules to decide which elements to render and/or how to render such elements, etc.

In this example, the layouts include a person layout 422, a location layout 424, and a phone number layout 426. The person layout 422 describes how to render first and last name fields for a person. The person layout 422 also refers to the location layout 424 and the phone number layout 426 to render related objects based on the location layout 424 and the phone number layout 426.

The actions 430 can describe behaviors, activities, operations, etc. For example, the actions 430 can describe interactions with the backend (e.g., requests, communications, etc.), what types of interactions with the backend are allowed and/or supported (e.g., types of requests, types of communications, etc.), navigation within the application from one layout to another, performing an action based on a state change, modifying a state (e.g., based on a user action, etc.), filtering data, defining an action representing a list or sequence of actions, and/or any other behaviors, activities, and/or operations.

In some cases, an action can be generated at least partly based on object definitions (e.g., object definitions 402). In some examples, when an object definition is modified, one or more associated actions can be updated and/or regenerated based on (e.g., to match, include, comport, etc.) the new object definition. In some cases, an action can be defined by a user (e.g., a designer or developer, a subject matter expert, etc.) to describe a flow and/or functionality of the application.

The actions 430 in the example shown in FIG. 4 include an action 432 for creating a person, an action 434 for navigating to a person layout, and an action 436 for adding a new home phone number. The action 432 for creating a person defines an input including person data based on a person object definition (e.g., person object 404) and an output based on the input. The action 434 for navigating to a person layout references the person layout 422. The action 436 for adding a new home phone number similar describes the input and output for adding a new home phone number. The actions 430 in FIG. 4 are merely illustrative examples provided for explanation purposes. Other examples can include more or less (same and/or different) actions than the actions 430 shown in FIG. 4.

Figure 5A:
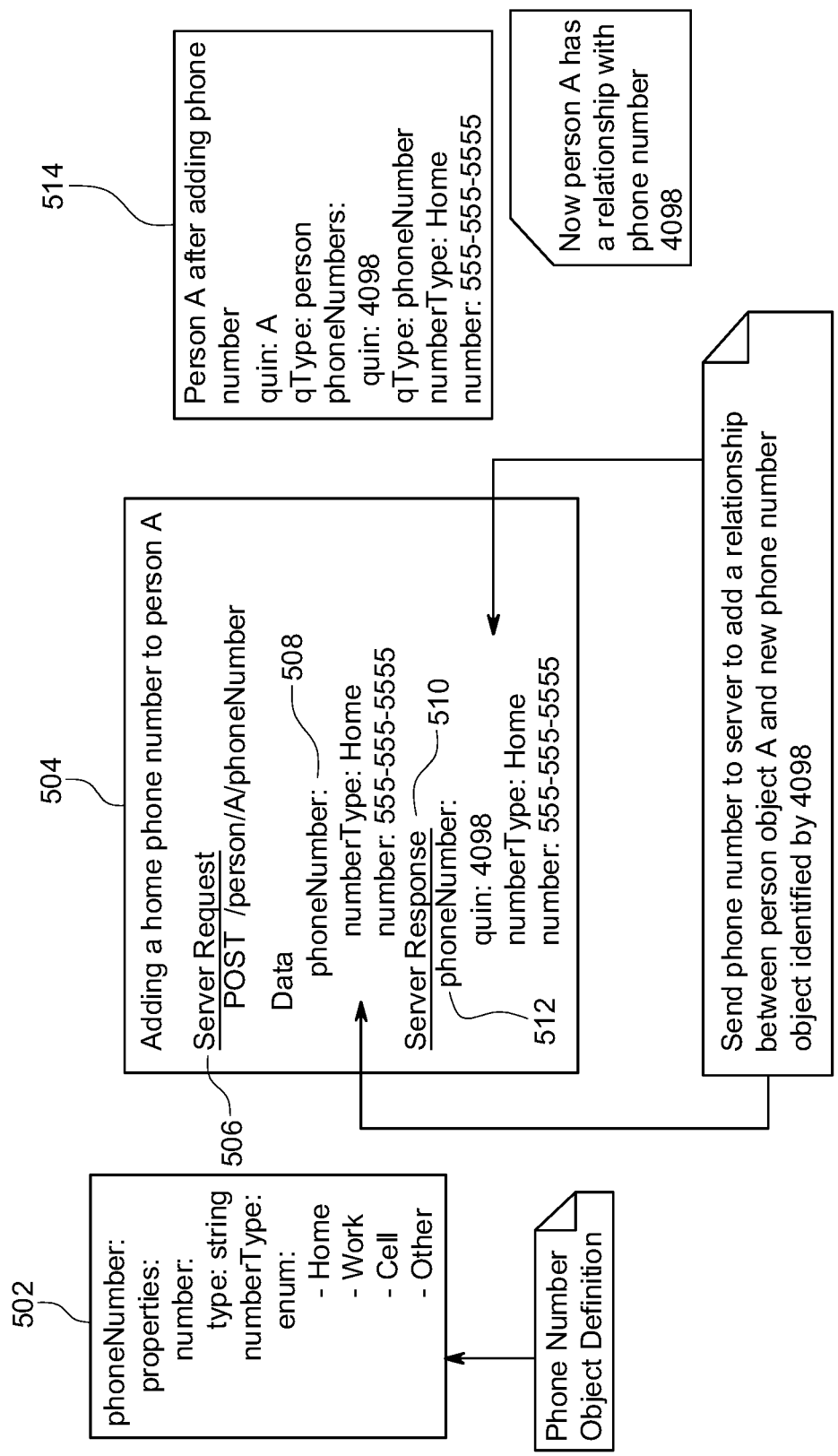
FIG. 5A is a diagram illustrating an action for adding a field to an object in an application, in accordance with some examples of the present disclosure.

FIG. 5A is a diagram illustrating an action for extending the schema of an object (e.g., a person object) in an application to add a new field, in accordance with some examples. In this example, an action 504 for adding a home phone number field to a person object is generated based on a phone number object definition 502. The action 504 defines a server request 506 and a server response 510 for adding the home phone number field to the person object. The server request 506 includes a phone number object 508 for the phone number to be added to the person object. The phone number object 508 can be linked/related to the person object to extend the person object to include a phone number field where a user can add a phone number value associated with the person.

The phone number object 508 can be sent to the server (e.g., the backend) to add a relationship between the person object and the new phone number object 512 in the server response 510. The person object 514 reflects the person object after being extended to include the home phone number field added based on the action 504. In this example, the home phone number field also shows a phone number field value added to the phone number field. However, it should be noted that a field, such as the phone number field, can be added and related to an object, such as the person object, with or without including a field value for that field. The field can be populated with a value, such as a string, at any other time and a value in a field can be modified as needed and/or allowed by the application rules.

FIG. 5B is a diagram illustrating an example description of an API endpoint action 520 for creating a relationship between the person object 514 and the phone number object 512. In some examples, the API endpoint action 520 can be generated based on the phone number object description 502 and a person object description.

The API endpoint action 520 can describe the server request structure and the server response structure. In some examples, the server request structure can include a reference 522 to the phone number object definition so the server (e.g., the backend) knows how to process the phone number object it receives. If a new field or relationship is added to the phone number object definition, the server can automatically handle the new data. Moreover, the server response structure can similarly include a reference 524 to the phone number object definition. If a new field or relationship is added to the phone number object definition, the client device can similarly adapt to the new data.

Figure 6A:
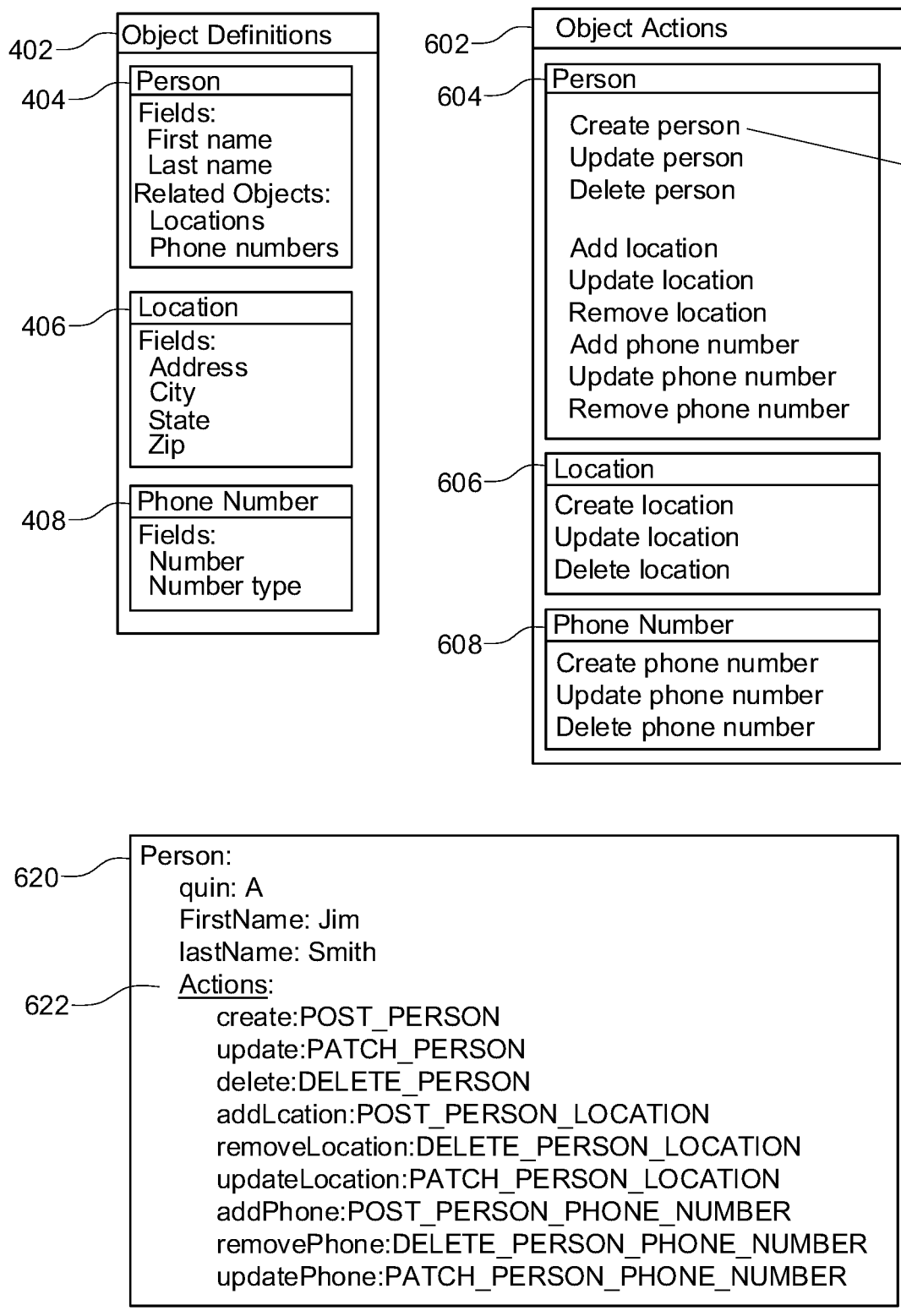
FIG. 6A illustrates object fields and relationships manipulated based on objection definitions and object actions, in accordance with some examples of the present disclosure.
Figure 6A:
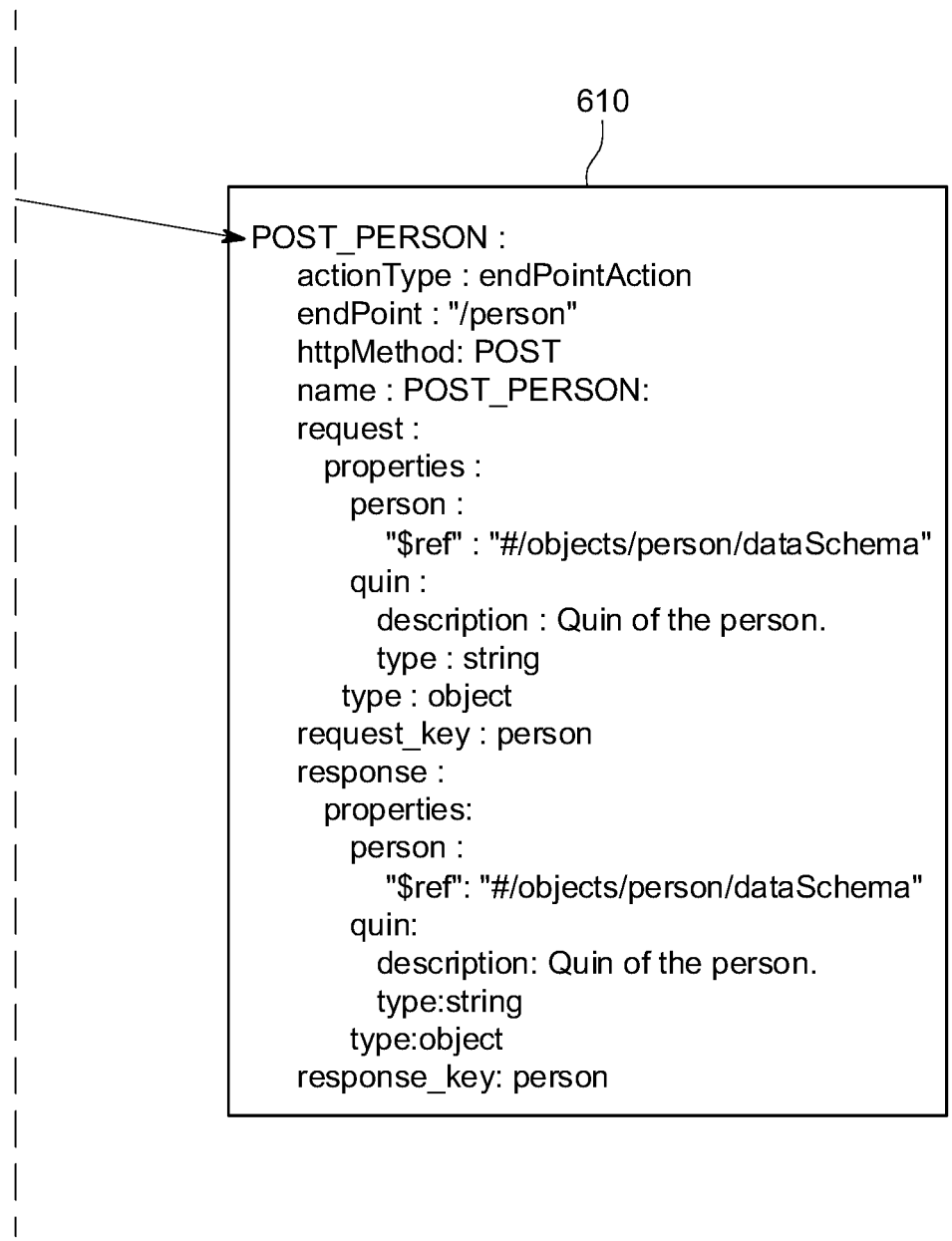

FIG. 6A illustrates object fields and relationships manipulated based on objection definitions 402 and object actions 602. Actions (e.g., object actions 602) can change as object definitions (e.g., object definitions 402) evolve in order to support application functionalities. In some examples, an object type can have one or more endpoint action configurations generated, which can describe how to create, update, delete, manipulate, etc., object fields and relationships.

In FIG. 6A, the object actions 602 include person actions 604, location actions 606, and phone number actions 608. The person actions 604 include actions for creating, updating and/or deleting a person. In some examples, the person actions 604 can include actions for related objects such as, for example, actions for adding, updating and/or removing location object fields, phone number object fields, etc. The location actions 606 include actions for creating, updating and/or deleting locations, and the phone number actions 608 include actions for creating, updating, and/or deleting phone numbers. Actions (e.g., 602, 604, 606, 608) can be defined per object (e.g., per person object, per location object, per phone number object, etc.) and/or per an instance of an object. For example, an object can include multiple instances of the object, which can be linked/inter-related. An action can be defined for the object and/or for a specific instance(s) of the object. To illustrate, a person object can be defined for a particular individual. If the particular individual associated with that person object was named John Doe at some point in time and later had a name change to Joe Doe, the person object for that particular individual can include an object instance for John Doe and another object instance for Joe Doe. Both object instances can be linked/correlated and identified as belonging to the person object, so users can see that the information associated with both instances correspond to the same individual. An action can then be defined for the person object and/or each instance of the person object which, in this example, includes the John Doe object instance and the Joe Doe object instance.

An endpoint action 610 for creating a person can describe the server request and server response structures for creating a person. The person object 620 includes person object fields and associated data. The person object 620 also includes endpoint actions 622 describing how to call each endpoint action for the person object 620. Non-limiting examples of endpoint actions can include creating an object (e.g., a person, a location, a phone number, etc.), updating an object, deleting an object, creating a relationship between objects, updating a relationship between objects, deleting a relationship between objects, etc.

Figure 6B:
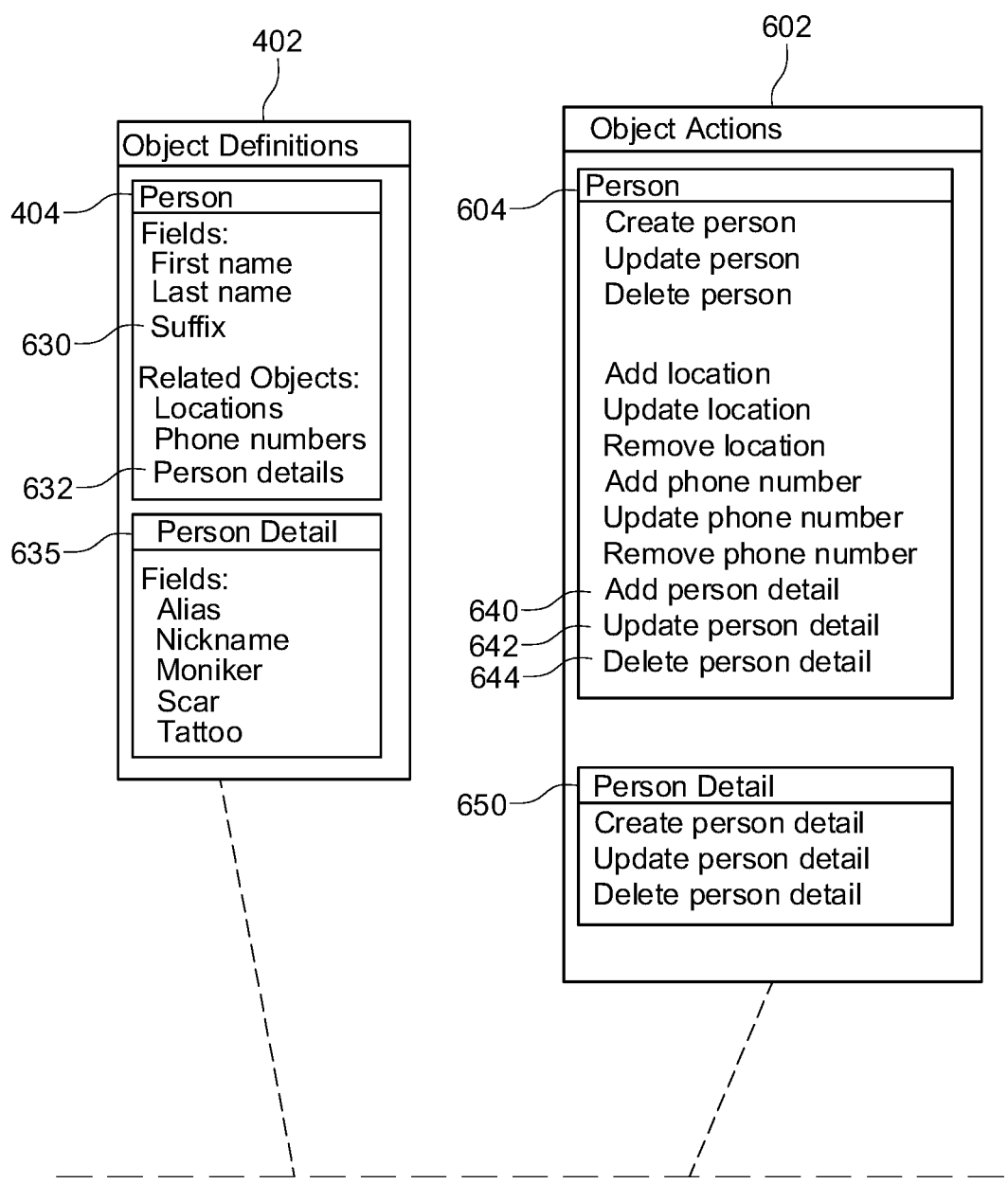
FIG. 6B illustrates changes in fields, relationships and objects generated based on object actions, in accordance with some examples of the present disclosure.
Figure 6B:
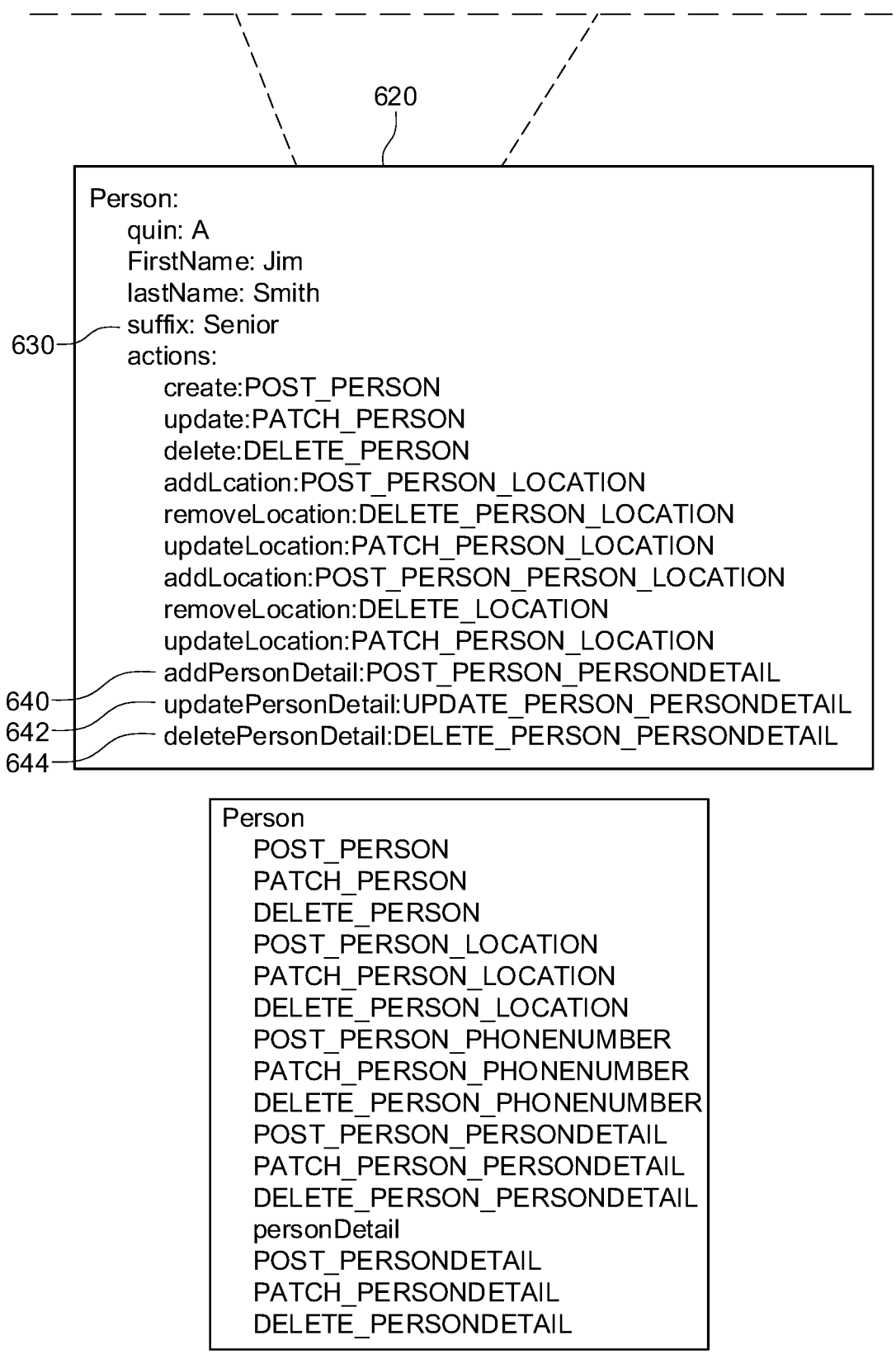

With object actions 602, new objects can be created, object fields can be changed, relationships can be changed, and/or any other changes can be implemented. FIG. 6B illustrates changes in fields, relationships and objects generated based on object actions. In this example, the person object definition 404 in the object definitions 402 has been modified to include a suffix field 630 for the person and a related person details object 632. The object definitions 402 have also been modified to include a person details object definition 635.

The person actions 604 in the object actions 602 have been modified to include actions 640, 642, 644 for adding, updating, and deleting a person detail object. The object actions 602 have also been modified to include person detail actions 650, which in this example include creating a person detail object, updating a person detail object, and deleting a person detail object. In some cases, the actions 640, 642, 644 can be generated to manage the newly-created relationship between the person and person detail objects.

Based on the updated object definitions 402 and the updated object actions 602, the person object 620 has been updated to include a suffix field 630 with corresponding data and the person detail actions 640, 642, 644 for managing a relationship between the person object 620 and a person detail object.

Figure 7:
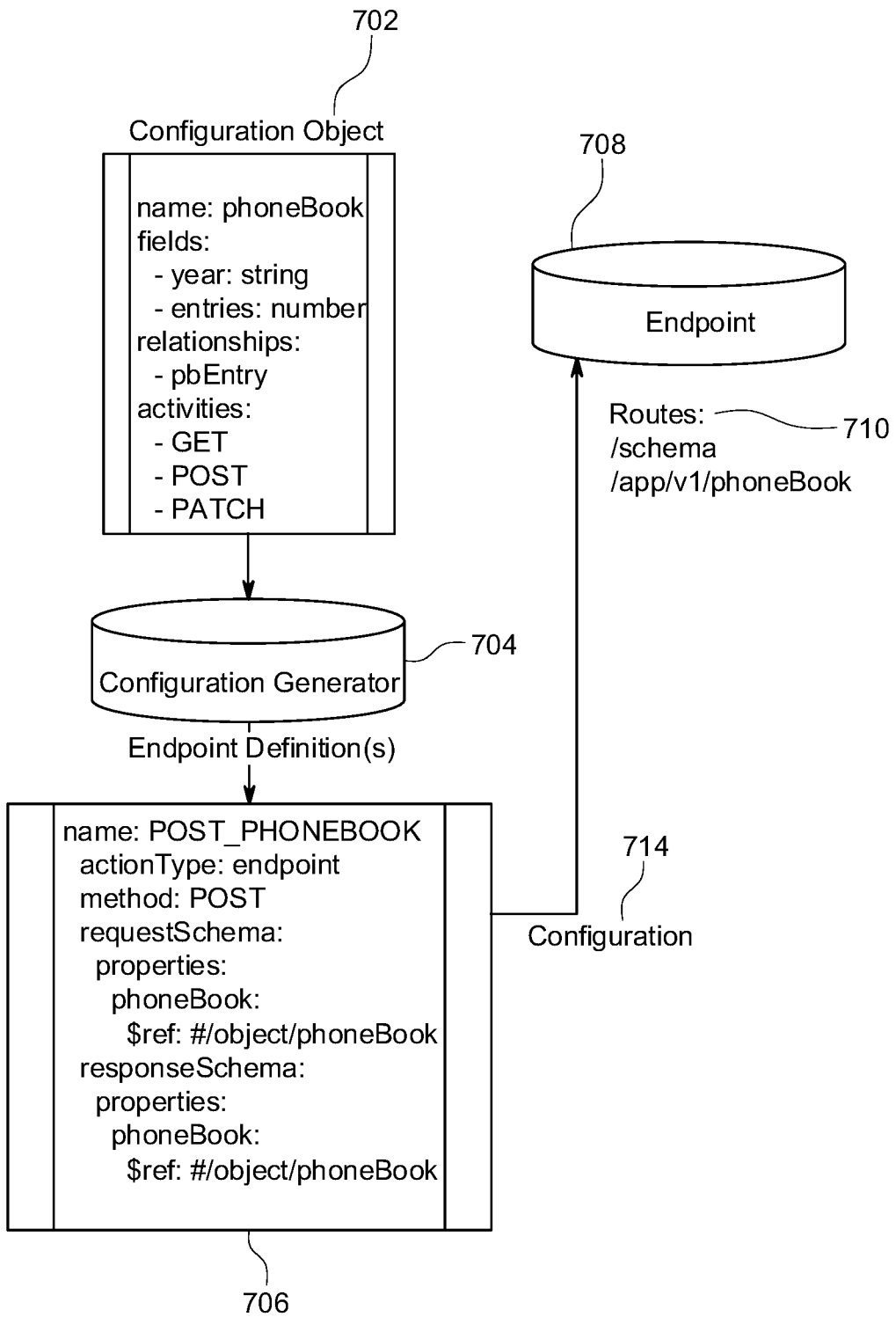
FIG. 7 is a diagram illustrating an example flow for using a configuration object to generate an application programming interface, in accordance with some examples of the present disclosure.
Figure 7:
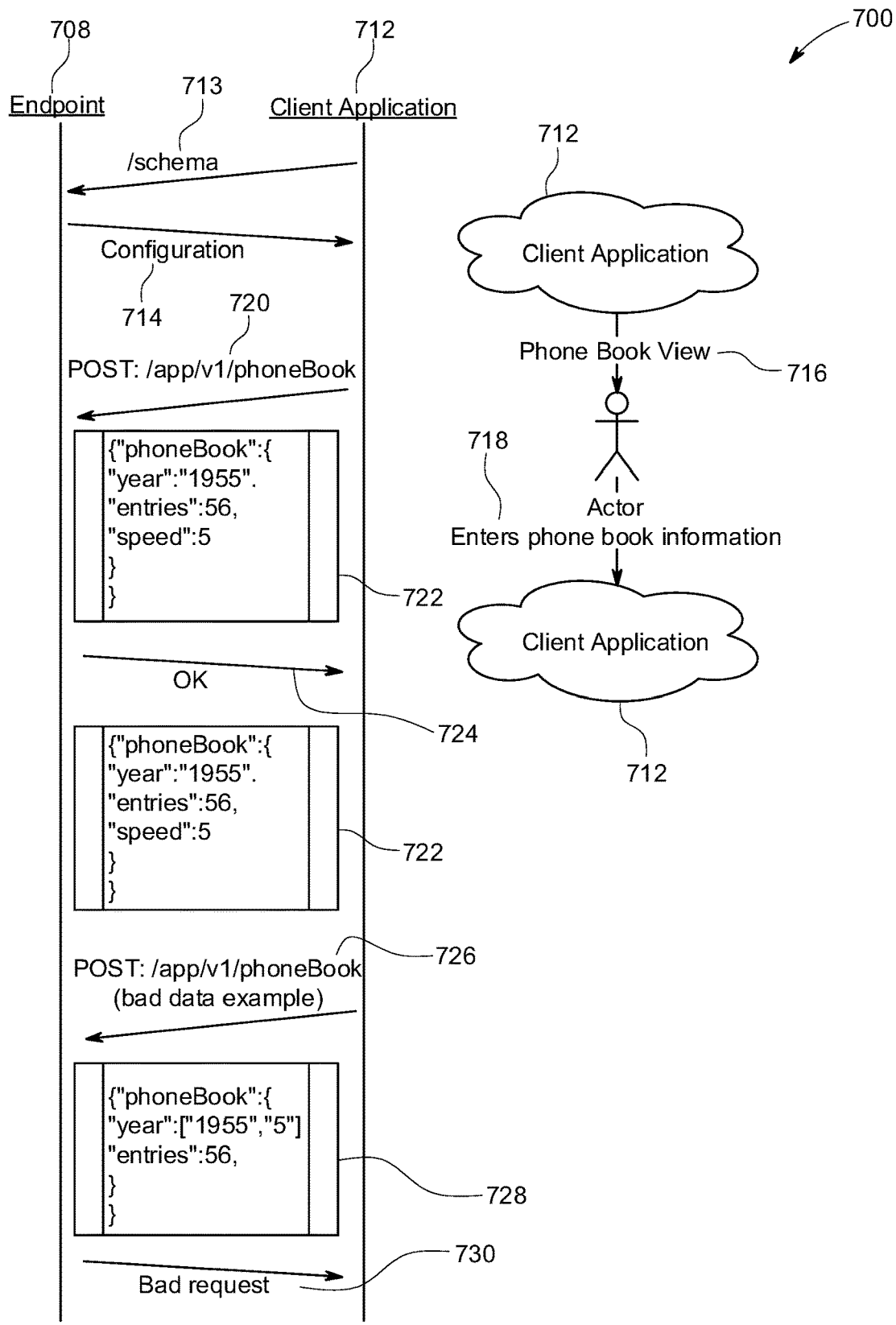

FIG. 7 is a diagram illustrating an example flow 700 for using a configuration object 702 to generate an API. A configuration generator 704 can use the configuration object 702 to generate an API definition(s) 706. An endpoint server 708 can load the configuration data 714 from the API definition(s) 706 and generate routes 710. In some cases, the endpoint server 708 can represent an endpoint from the endpoints 108 shown in FIG. 1. In other cases, the endpoint server 708 can be a separate endpoint implemented and/or hosted by the application system 102.

A client application 712 can use a route 713 from the generated routes 710 to send a request 713 to the endpoint server 708 to synchronize the configuration data 714. In some cases, the client application 712 can be the same application as application 104 shown in FIG. 1. In other cases, the client application 712 can be a different application than the application 104 in FIG. 1.

The client application 712 can receive the configuration data 714 from the endpoint server 708. In some examples, the client application 712 can generate one or more layouts 716 for the user to enter, access, and/or save data across a trust boundary between the client application 712 and the endpoint server 708. For example, the client application 712 can generate a phone book layout providing a view for a user to enter, access, and/or save phone book data in the client application 712. The trust boundary can represent or define a boundary where the computer instructions can be verified as correctly implementing access controls and data integrity. For example, in some cases, a trust boundary can be established when the computer instructions implementing a rule(s), permission(s), access control(s), etc., can be validated and/or trusted to ensure the correct instructions are used to evaluate rules, permissions, user access controls, etc., and hacked/tampered or otherwise incorrect/modified instructions are not being used. In some examples, trusted components can ensure the data has passed between components without modification.

When the client application 712 enters and/or saves data 722 through the one or more layouts 716, the client application 712 can send a request 720 to the endpoint server 708 to synchronize the data 722. The client application 712 can use a route from the routes 710 generated by the endpoint server 708 to communicate the request 720. In some examples, the data 722 can include data and/or configurations entered and/or updated by the client application 712.

The endpoint server 708 can use the API definition(s) 706 to verify the data 722 from the client application 712. If the data 722 is verified to be correct (e.g., the data 722 matches and/or comports with the configuration object 702 and/or associated definitions, properties, attributes, types, formats, etc.), the endpoint server 708 can send a response 724 to the client application 712 indicating that the data 722 has been verified and/or is correct.

In some examples, if the client application 712 sends a request 726 to the endpoint server 708 with data 728 that is incorrect, the endpoint server 708 can determine that the data 728 is incorrect and/or cannot be verified. The endpoint server 708 can then send a response 730 to the client application 712 indicating that the data 726 is incorrect and/or cannot be verified. In some examples, the client application 712 can prevent a user from providing incorrect data and/or performing prohibited actions and/or can notify a user if data and/or actions from the user are invalid/prohibited.

In some cases, some or all of the components of the client application 712 can enforce rules and permissions defined by the application definition and the user's access controls. Components outside the trust boundary (e.g., untrusted clients, untrusted client components, etc.) can submit data across the trust boundary that has complied with the rules and permissions. Components inside the trust boundary can evaluate the rules and permissions as defined by the application and the user's access controls and validate that they are consistent with the data submitted by the components outside of the trust boundary.

FIG. 8A is a diagram illustrating example object relationships 810. Object types can be related to other object types. In some cases, such relations can allow related objects to be retrieved and/or updated through a same request (e.g., a same API call) to the backend (e.g., to an endpoint server on the application system 102). The backend can understand and/or know how to maintain the data of each object type, allowing creating, updating, manipulation, and deletion of objects. For example, the backend can use the object definitions 402 to determine that an object type has fields that hold data and a list of related objects.

In this example, the person object 802 is related to location objects 804 and phone number objects 806. The person object 802 can be related to the location objects 804 and phone number objects 806 as specified in the object definitions 402. Moreover, in this example, the relationships 810 can include a person and location relationship 812 relating the person object 802 and a location object 820 associated with the location objects 804, a person and number relationship 814 relating the person object 802 and a phone number object 822 associated with the phone number objects 806, and a person and number relationship 816 relating the person object 802 and another phone number object 824 associated with the phone number objects 806.

In some cases, the relationships 810 can be used to access, update, and/or manipulate the person object 802, the location object 820, and/or the phone number objects 822, 824 through a same call to the backend. The backend can understand and/or know how to maintain the data of each object type based on the object definitions 402.

Figure 9:
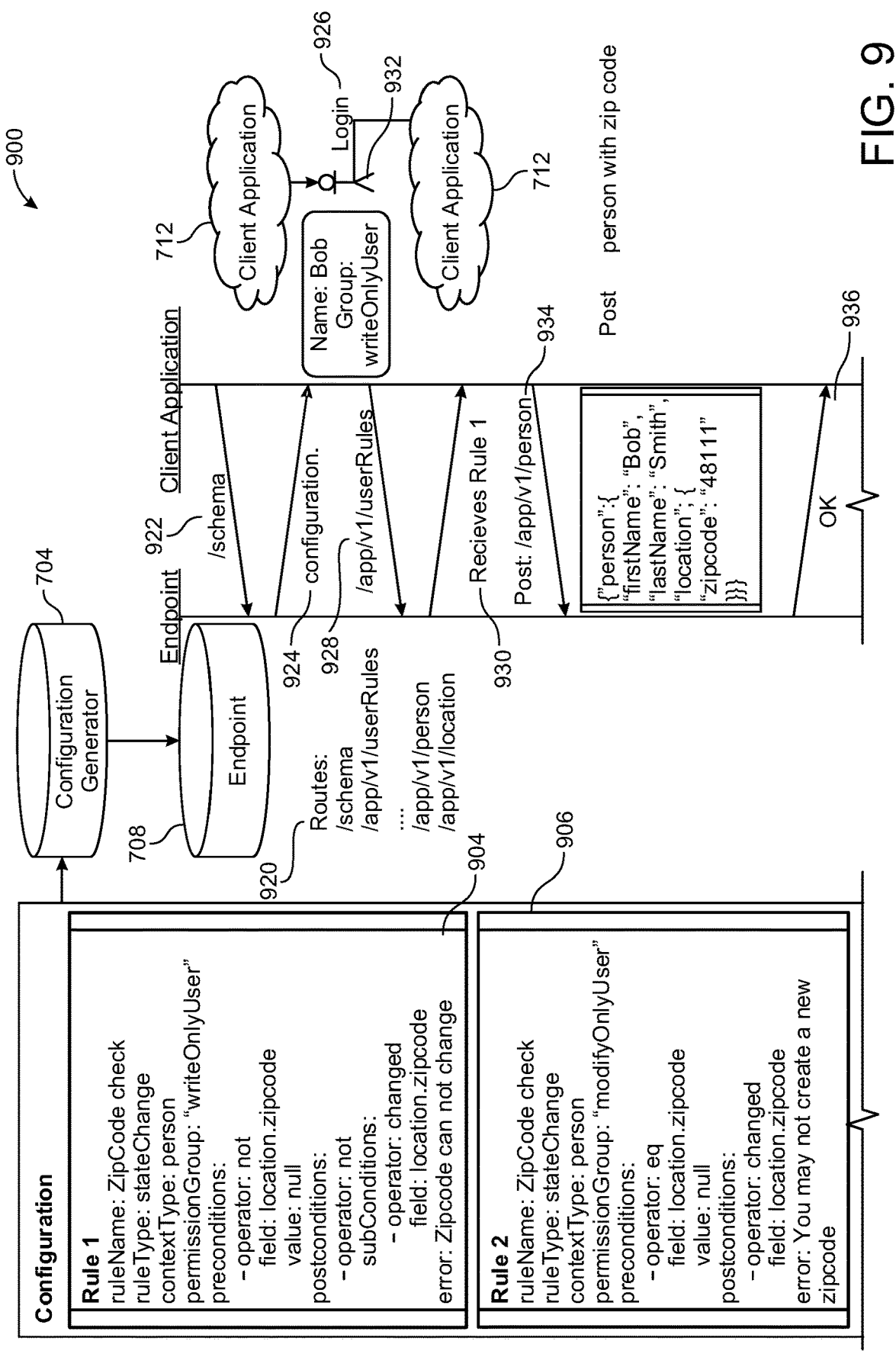
FIG. 9 is a diagram illustrating an example flow for using rules to determine what operations are allowed on objects and fields as data changes in a configuration-driven application, in accordance with some examples of the present disclosure.
Figure 9:
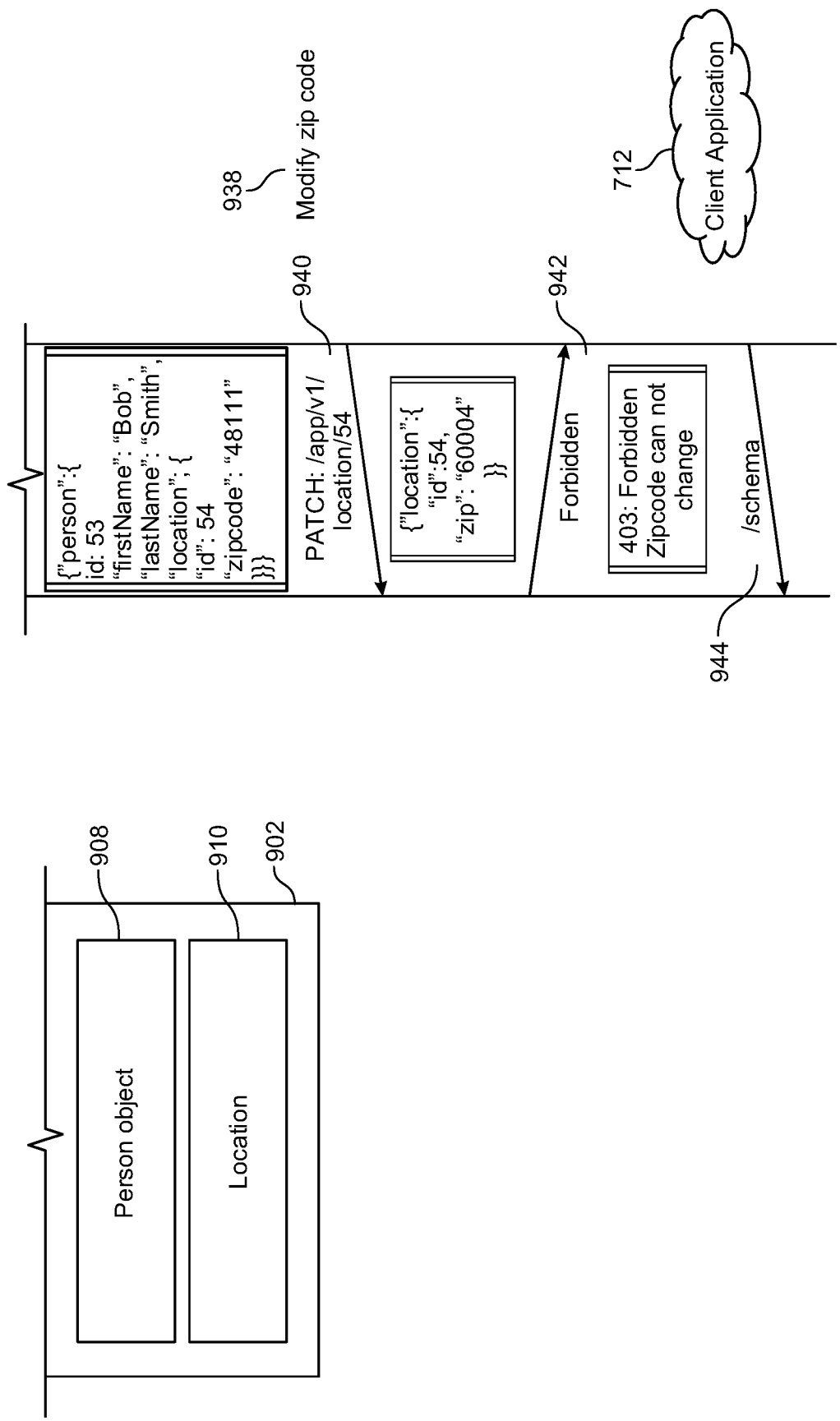
Figure 9:
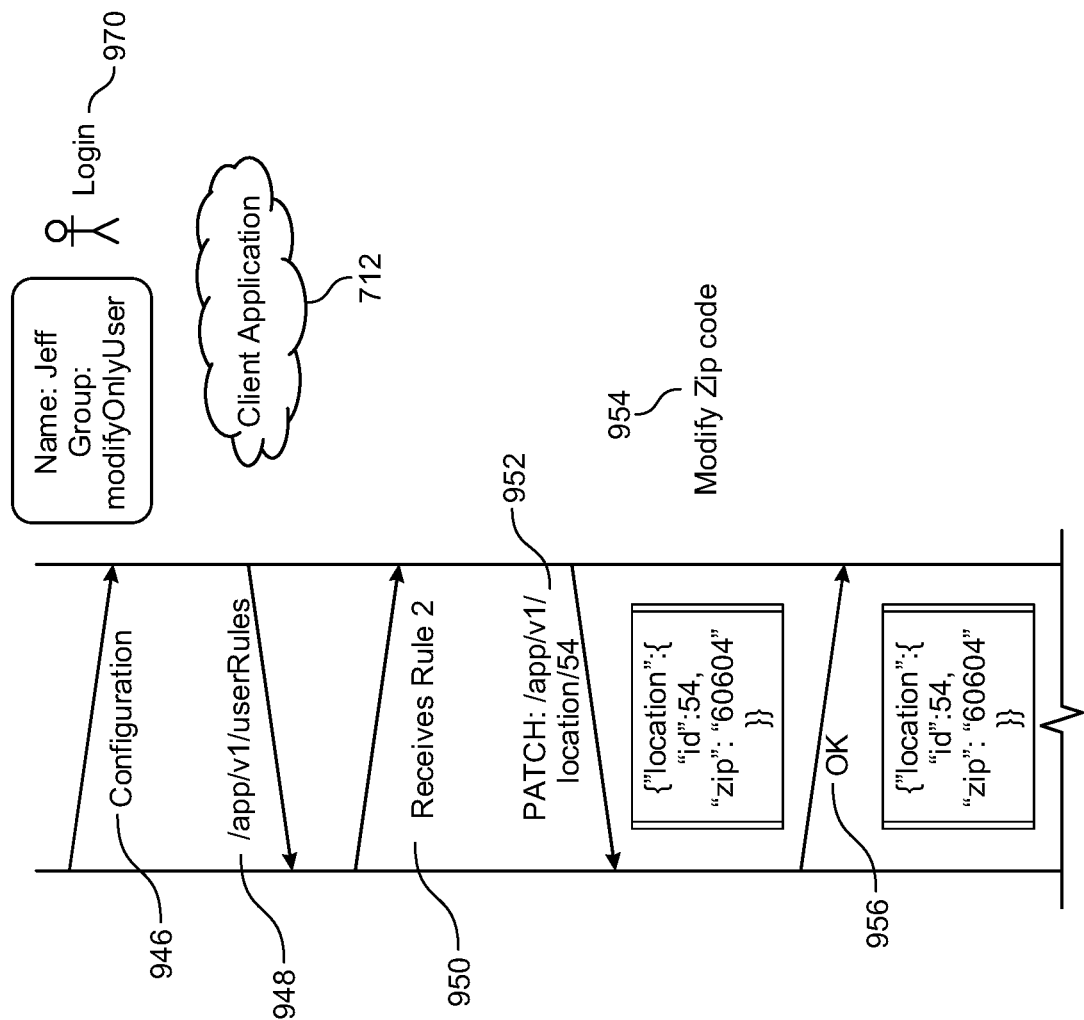
Figure 9:
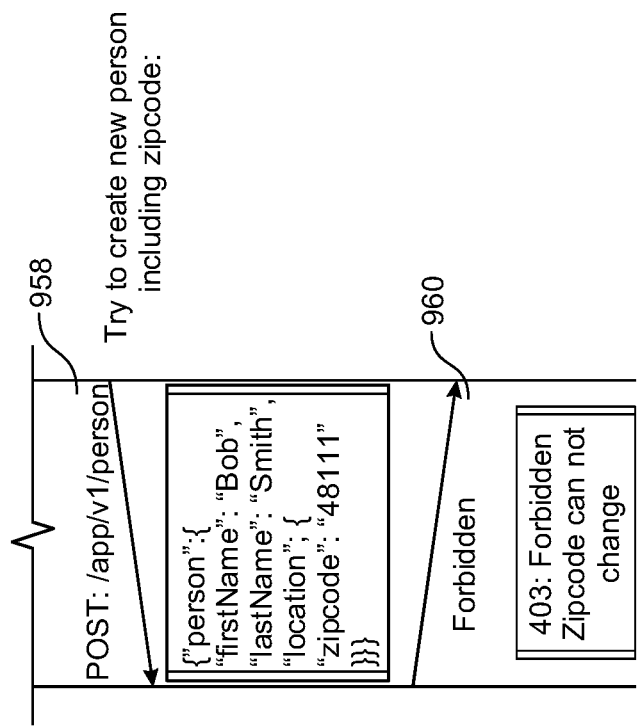

FIG. 9 is a diagram illustrating an example flow 900 for using rules to determine what operations are allowed on objects and fields as data changes in a configuration-driven application. In this example, a configuration 902 includes rules 904 and 906 for determining operations on a person object 908. Rules 904 and 906 include Rule 904 preconditions and postconditions. As shown, rule 904 specifies that if a zip code on a location field 910 of the person object 908 is set (e.g., precondition), the zip code on the location field 910 of the person object 908 should not be modified (e.g., postcondition), and rule 906 specifies that if a zip code on the location field 910 of the person object 908 is not set (e.g., precondition), the zip code on the location field 910 of the person object 908 can be set (e.g., postcondition).

In some cases, rules 904 and/or 906 can apply to users and/or groups with certain permissions. For example, rule 904 can indicate that users and/or groups that do not have modify permissions (e.g., edit/write permissions) cannot modify a zip code on the location field 910 of the person object 908 if the zip code is already set. Similarly, rule 906 can indicate that users and/or groups that only have modify permissions (and/or do not have permission to add/create) cannot set a zip code on the location field 910 of the person object 908 if the zip code is not already set.

In some cases, when a precondition in a rule is not satisfied (e.g., is false, fails, etc.), processing and/or evaluation of the postcondition in the rule can be terminated and/or prevented from initiating. Moreover, in some cases, if a precondition in a rule is satisfied (e.g., is true), a false postcondition can result in a failure.

The rules 904 and 906 can be generated by the configuration generator 704 and/or any other component of the application system 102. Moreover, in some examples, the configuration generator 704 can process the rules 904 and 906 and/or load the rules 904 and 906 on the endpoint server 708. The endpoint server 708 can use the rules 904 and 906 to generate routes 920 for calls (e.g., requests, responses, interactions, etc.) between the endpoint server 708 and the client application 712. In some examples, the routes 920 can enable interactions between the endpoint server 708 and the client application 712 to perform operations according to the rules 904 and 906.

In some cases, the client application 712 and the endpoint server 708 can use one or more of the routes 920 to exchange requests and responses 922 and 924, respectively, to synchronize configuration data. In some examples, when a user 932 logs in 926 to the client application 712, the client application 712 can use one or more routes from the routes 920 to send a request 928 to the endpoint server 708 for the rules 904 and/or 906. In some cases, the request 928 can request a rules manifest, which can include rules 904 and/or 906.

The endpoint server 708 can receive the request 928 and send a response 930 to the client application 712. The response 930 can include rule 904. In some cases, the response 930 can also include rule 906 and/or any other rules.

In this example, the user 932 has tried to create a new person with a zip code. The user 932 can create the person and set the zip code from the client application 712. Moreover, since the new person does not already have a zip code and the user 932 has write permissions (e.g., permissions to create), the precondition of rule 904 will be satisfied and the postcondition of the rule 904 (e.g., setting the zip code) can proceed and/or can be implemented. When the client application 712 sends a request 934 to the endpoint server 708 to create the person with the zip code, the endpoint server 708 can determine that the operation in the request 934 (e.g., creating the person and setting the zip code) satisfies the rule 904. The endpoint server 708 can process the request 934 to create the person with the zip code and send a response 936 to the client application 712 indicating that the request 934 has succeeded.

Since the zip code has already been set for the person and the user 932 in this example does not have modify (e.g., edit) permissions, if the user 932 later tries to modify 938 the zip code for the person, the operation to modify 938 the zip code will fail the rule 906. In some cases, when the user 932 tries to modify 938 the zip code for the person, the client application 712 can nevertheless send to the endpoint server 708 a request 940 to modify the zip code. In some cases, the client application 712 can generate a warning that modifying the zip code violates (e.g., does not pass, does not satisfy, etc.) rule 906. In this example, the client application 712 does not enforce the rule 906 and instead generates the request 940 even though rule 906 will not be satisfied. In other examples, the client application 712 may enforce the rule 906 and consequently may not generate the request 940 and/or may prevent the user 932 from modifying (or trying to modify) the zip code.

When the endpoint server 708 receives the request 940, the endpoint server 708 can determine that the request 940 (e.g., the modification of the zip code in the request 940) fails the rule 906. The endpoint server 708 can send the client application 712 a response 942 indicating that the operation to modify the zip code has failed.

If a different user, user 970, logs into the client application 712 (on a same or different device), the client application 712 and the endpoint server 708 can exchange requests and responses 944 and 946, respectively, to synchronize configuration data. The client application 712 can then send endpoint server 708 a request 948 for rules. In this example, the user 970 only has modify permissions and can therefore modify data associated with the person object but cannot create data associated with the person object.

Endpoint server 708 can receive the request 948 and send client application 712 a response 950 including rule 906, which applies to user 970 (e.g., given the modify permissions of user 970). If the user 970 tries to modify 954 the zip code of the person, the client application 712 can send endpoint server 708 a request 952 to modify the zip code accordingly. The endpoint server 708 can receive the request 952 and determine that the request 952 (and/or the operation in the request 952) satisfies rule 906. The endpoint server 708 can send the client application 712 a response 956 indicating that the request 952 has succeeded.

Since the user 970 does not have permissions to create a new person, if the user 970 tries to create a new person with a zip code, the operation to create the new person with the zip code will fail rule 906. In some examples, the client application 712 can send endpoint server 708 a request 958 to create the new person with the zip code, and receive from endpoint server 708 a response 960 indicating that the request has failed.

Figure 10A:
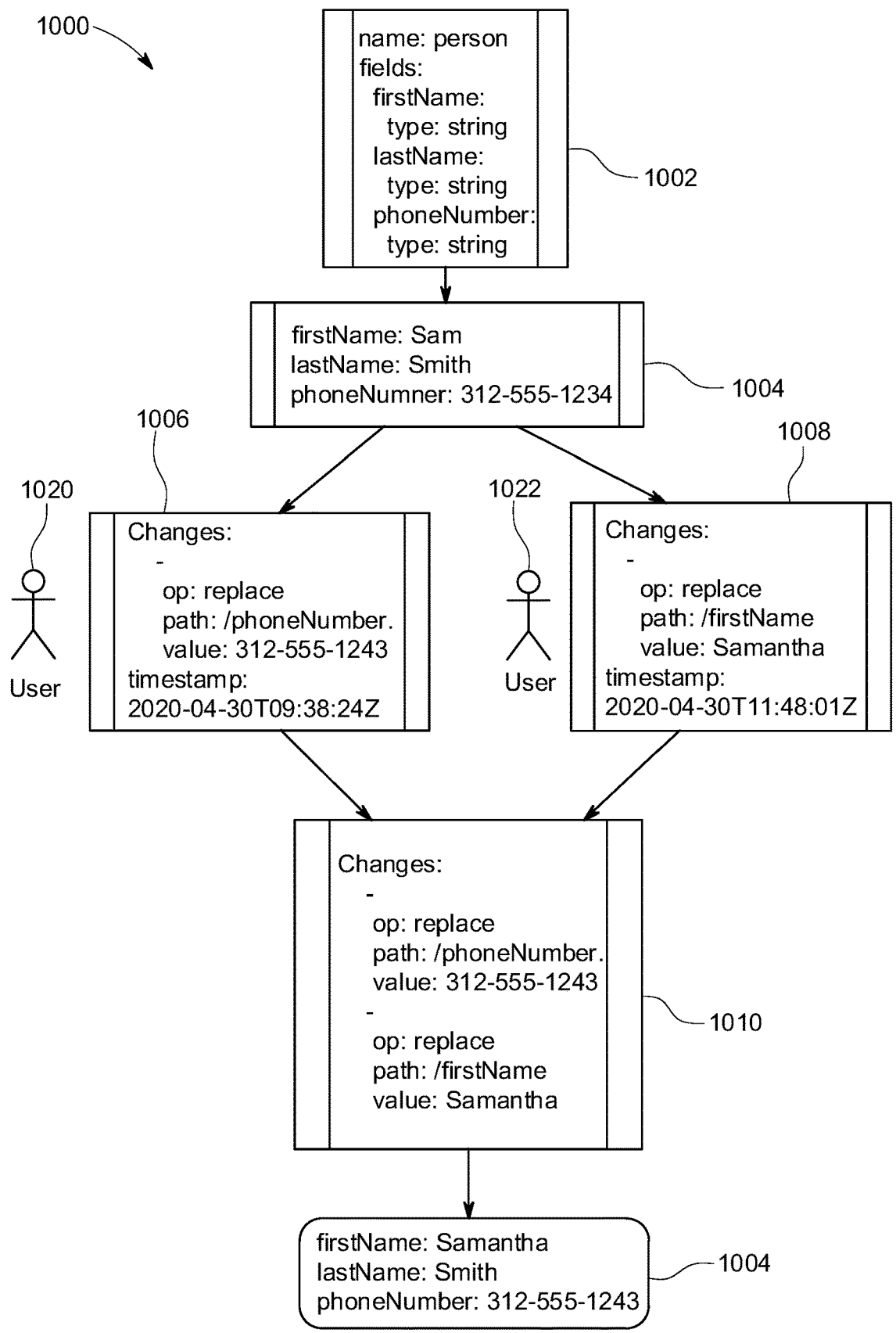
FIG. 10A is a diagram illustrating an example flow for synchronizing fields for an object, in accordance with some examples of the present disclosure.

FIG. 10A is a diagram illustrating an example flow 1000 for synchronizing fields for an object. In this example, the flow 1000 illustrates synchronization of changes to different fields. However, one of ordinary skill in the art will recognize that, in other examples, changes to a same field of an object can be similarly synchronized.

As shown, an object definition 1002 defines various fields associated with a certain type of object. The object 1004 includes data values for the fields defined by the object definition 1002. User 1020 has made a change to a phone number field in the object 1004. The change can generate an action 1006 to replace a current value of the phone number field with the new value entered by the user 1020.

User 1022 has made a change to a name field in the object 1004. The change can generate action 1008 to replace a current value of the name field with the new value entered by the user 1022.

The action 1006 and the action 1008 can be synchronized to generate action 1010 for implementing the changes from action 1006 and action 1008 (e.g., changing the phone number and the name). The object 1004 can then be updated based on the action 1010 to reflect the changes from user 1020 and user 1022 (e.g., the from action 1006 and action 1008). At this point, the changes from the user 1020 and user 1022 have been synchronized in object 1004. Other changes to objects, fields, and/or other data from different users and devices can be similarly synchronized to maintain data of an application synchronized across the different devices and implementations.

Figure 10B:
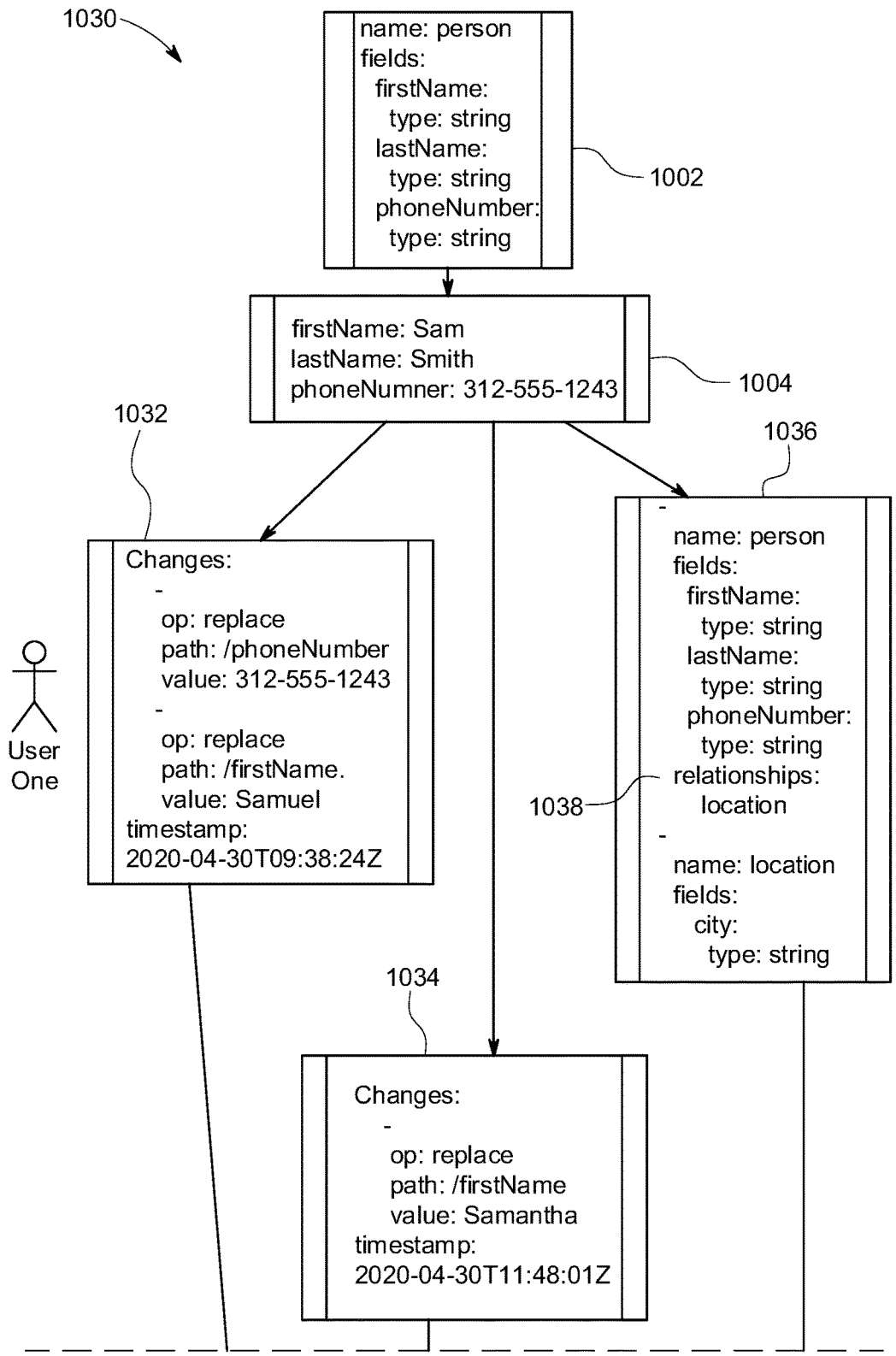
FIG. 10B is a diagram illustrating an example flow for performing a schema update for an object, in accordance with some examples of the present disclosure.
Figure 10B:
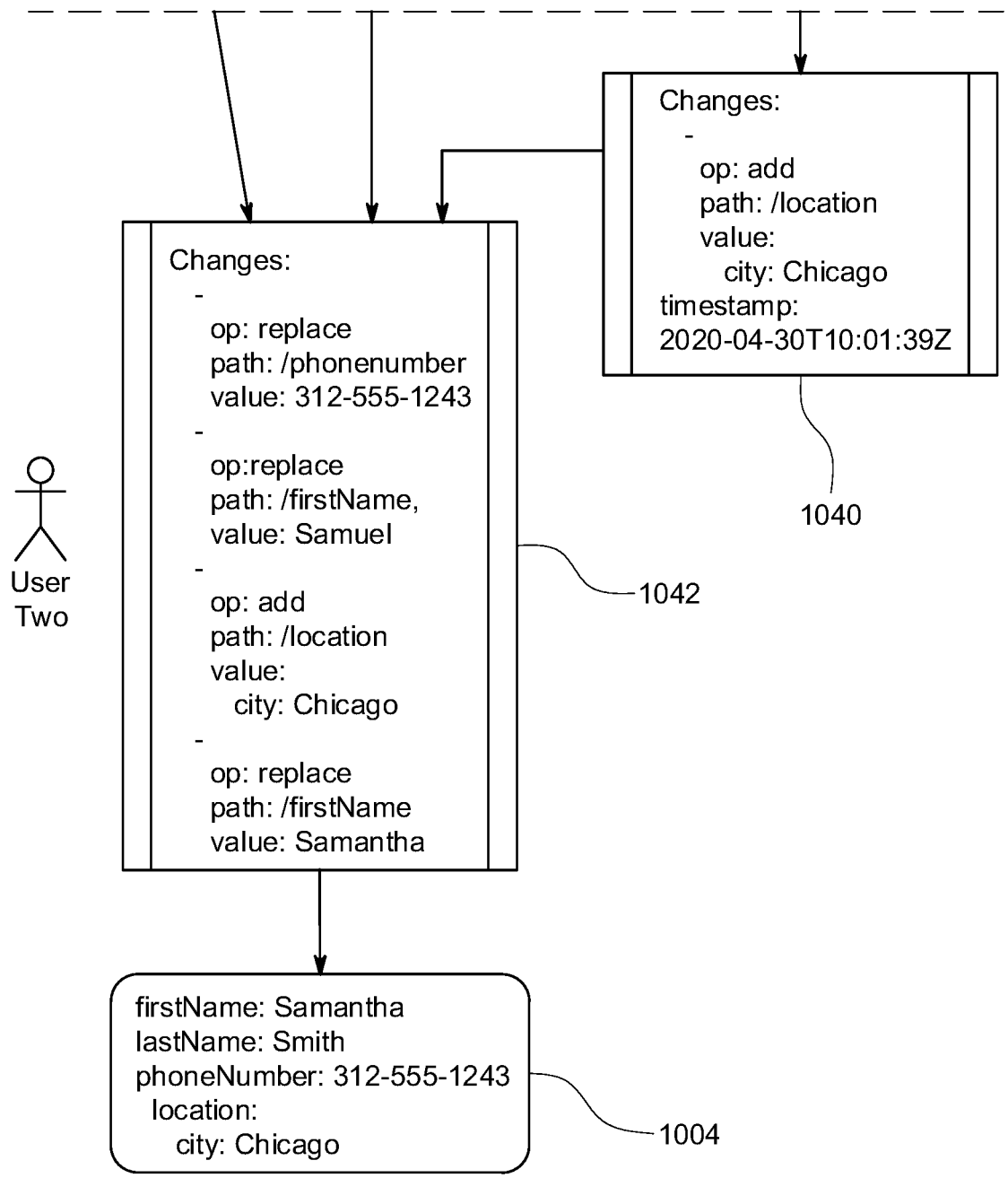

FIG. 10B is a diagram illustrating an example flow 1030 for performing a schema update for an object. In this example, an action 1032 has been generated for changing a phone number and name in the object 1004. Another action 1034 has also been generated to change the name in the object 1004.

Moreover, an updated object definition 1036 has been generated for the object 1004. The updated object definition 1036 can include the object definition 1002 with one or more changes. In this example, the updated object definition 1036 defines the fields from object definition 1002 and includes relationships 1038 added to relate a location object to the object associated with the object definition 1004 and 1036. An action 1040 has also been generated to add a location to the object 1004. As previously noted, the updated object definition 1036 includes a related location object, which can be updated to include the location information from action 1040.

An action 1042 can be generated to synchronize the changes from actions 1032, 1034 and 1040. For example, the action 1042 can include an operation to change the phone number and name field values according to action 1032, change the name field value according to action 1034, and add the location field value according to action 1040. The object 1004 can then be updated based on the action 1042. The updated object 1004 can include the phone number value from action 1032, the name value from action 1034, and the location value from action 1040. At this point, the schema and data associated with object 1004 has been updated and is synchronized across devices and applications.

Figure 11:
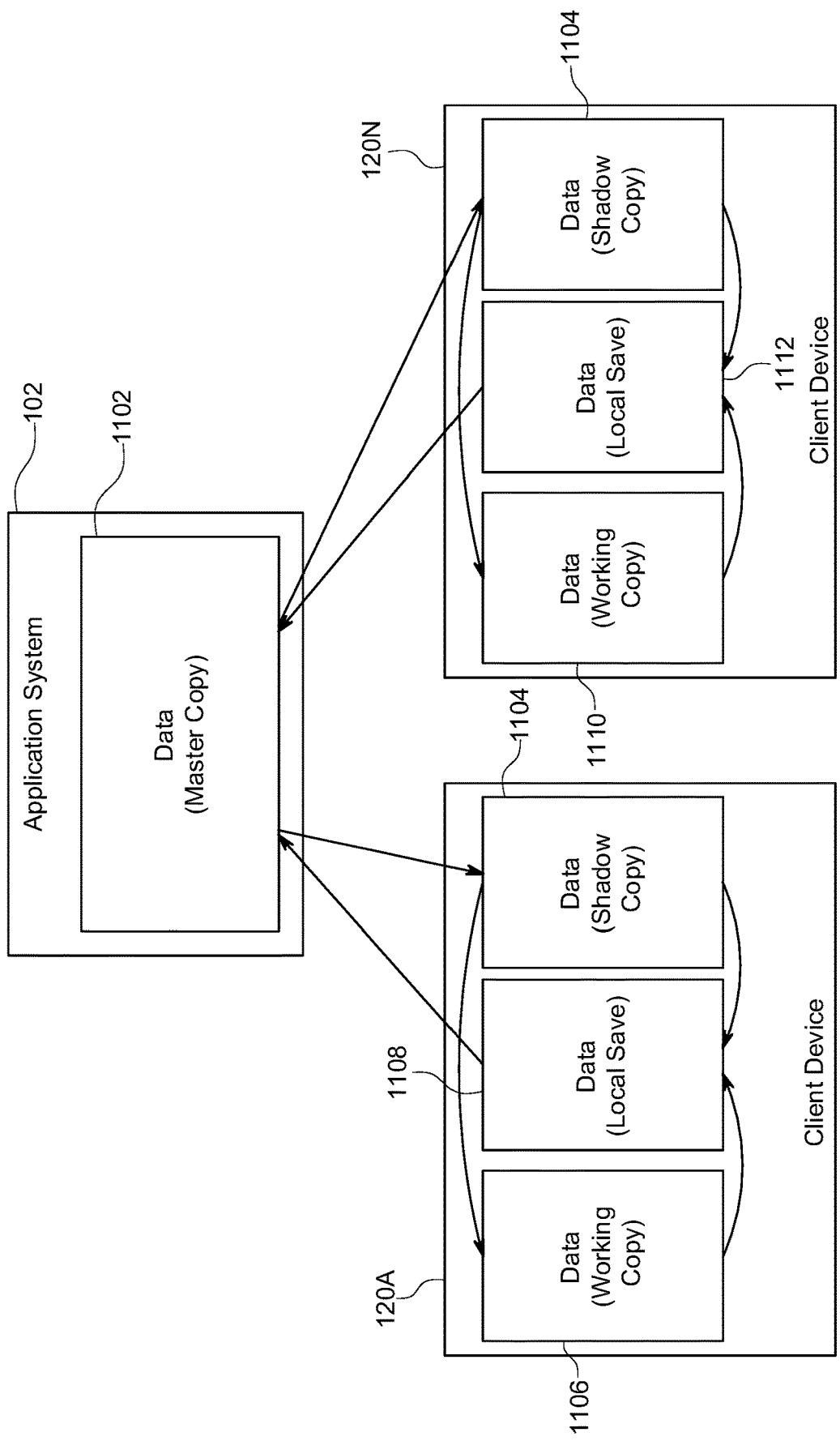
FIG. 11 is a diagram illustrating an example for synchronizing application data across devices, in accordance with some examples of the present disclosure.

FIG. 11 is a diagram illustrating an example for synchronizing application data across devices. The application system 102 can maintain a master copy 1102 of the data corresponding to an application (e.g., 104). The data can include any data and/or data values used by and/or maintained for the application. In some examples, the data can include application data, configurations, metadata, etc. The application system 102 can maintain a master copy of data for each of the applications 104 hosted by the application system 102.

The client devices 120A through 120N can obtain and store a shadow copy 1104 of the master copy 1102 on the application system 102. The shadow copy 1104 can be a mirrored, local, and/or synchronized copy of the master copy 1102. In some examples, the shadow copy 1104 on the client devices 120A through 120N can be updated periodically based on current version of the master copy 1102 and/or any time that the master copy 1102 is modified. For example, the shadow copy 1104 can be periodically updated through push notifications from the application system 102 and/or polling by the client devices 120A through 120N.

The client devices 120A through 120N can respectively store working copies 1106 and 1110 of the data. The working copies 1106 can be copies of the shadow copy 1104 used to work from and/or make changes to the data on the shadow copy 1104 at the client devices 120A through 120N. For example, working copy 1106 on client device 120A can be a working copy of the shadow copy 1104 used by the user at the client device 120A when implementing changes to the shadow copy 1104 at the client device 120A, and the working copy 1110 on client device 120N can be a working copy of the shadow copy 1104 used by the user at the client device 120N when implementing changes to the shadow copy 1104 at the client device 120N.

Any changes made to the working copy 1104 at the client devices 120A through 120N, which are reflected in the working copies 1106 and 1110, can be saved and reflected in the local copies 1108 and 1112. For example, when the client device 120A saves any changes made to the working copy 1106, the client device 120A can create and/or update a local copy 1108 that includes the changes made to the working copy 1106. Thus, the local copy 1108 can reflect the data in the shadow copy 1104 with any changes made through the working copy 1106.

Similarly, when the client device 120N saves any changes made to the working copy 1110, the client device 120N can create and/or update a local copy 1112 that includes the changes made to the working copy 1110. Thus, the local copy 1112 can reflect the data in the shadow copy 1104 with any changes made through the working copy 1110.

The client devices 120A through 120N can send the local copies 1108 and 1112 to the application system 102 to synchronize changes made to the shadow copies 1104 at the client devices 120A through 120N with the master copy 1102 at the application system 102. In some examples, the application system 102 can obtain the local copies 1108 and 1112 from the client devices 120A through 120N and reconcile differences between the master copy 1102, the local copy 1108 and the local copy 1112. The application system 102 can update the master copy 1102 accordingly and provide (e.g., via a push by the application system 102, a pull by the client devices, and/or any other form) the master copy 1102 (and/or changes made to the master copy 1102) to the client devices 120A through 120N.

The client devices 120A through 120N can synchronize the updated master copy 1102 with the shadow copies 1104 (e.g., by reconciling changes), replace the shadow copies 1104 with new shadow copies mirroring the updated master copy 1102, or otherwise update the shadow copies 1104 to mirror the updated master copy 1102. In this way, as shown in FIG. 11, the application system 102 and the client devices 120A through 120N can maintain synchronized copies of the application data and can avoid (and/or resolve) data conflicts.

Figure 12A:
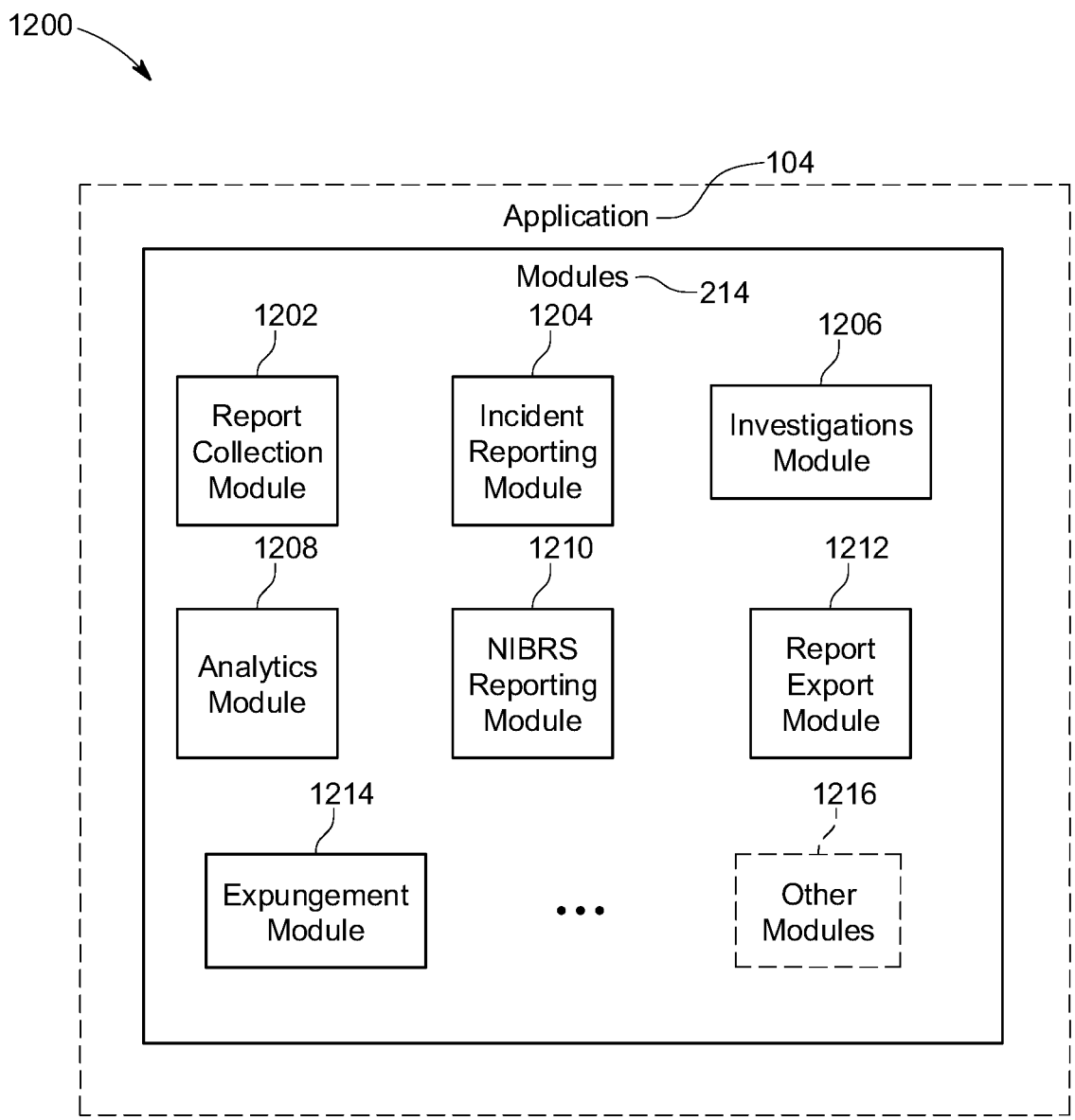
FIG. 12A is a diagram of an example use case of an application generated using an example application configuration, in accordance with some examples of the present disclosure.
Figure 12B:
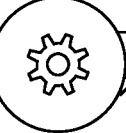
FIG. 12B is a diagram illustrating an example view displayed by an application based on a layout for a specific device platform, in accordance with some examples of the present disclosure.

FIG. 12A is a diagram of an example use case 1200 of an application 104 generated using an example application configuration, in accordance with some examples of the present disclosure. In this example, the use case 1200 represents a police department use case and includes example modules 1214 implemented by the application 104 for an example police application domain of the particular use case 1200. This example police department use case (and domain) is provided as an illustrative example for explanation purposes. It should be noted that other example use cases and domains are also contemplated herein. One of skill in the art will recognize that the technologies and principles herein can be applied to any other application use cases and/or domains.

The modules 214 in this example can include a report collection module 1202, an incident reporting module 1204, an investigative module 1206, an analytics module 1208, an NIBRS (national incident-based reporting system) reporting module 1210, a report export module 1212, an expungement module 1214, and one or more other modules 1216.

The report collection module 1202 can perform patrol report collection task. For example, the report collection module 1202 can be used by police officers to collect information on cases for investigation and adjudication.

The incident reporting module 1204 can perform citizen incident reporting tasks. For example, the report collection module 1202 can allow citizens to report incident information to law enforcement.

The investigative module 1206 can support investigation tasks. For example, the investigative module 1206 can be used by investigators to determine if additional details are needed to present evidence of a criminal offense to prosecutors and direct resources to collect such evidence. In some cases, this module can also allow related reports to be correlated to assist in building an overall picture of criminal activity.

The analytics module 1208 can support analytics tasks. For example, in some cases, the analytics module 1208 can deliver insights into patterns of activity based on collected information from other modules.

The NIBRS reporting module 1210 can support NIBRS reporting capabilities. In some examples, the NIBRS reporting module 1210 can export data collected from the report collection and investigations modules to a specific agency, such as the Federal Bureau of Investigations, to fulfil mandated reporting requirements.

A report export module 1212 can support report exports. In some cases, the report export module 1212 can select data to be exported in a specified format for transmittal to interested parties such as prosecutors, defendants, requestors of freedom-of-information act (FOIA) data, etc. In some examples, data redaction templates and/or exfiltration rules can be applied based on the requesting party.

The expungement module 1214 can provide data expungement capabilities. In some examples, the expungement module 1214 can remove data marked as deleted. In some cases, when data is deleted, the underling history and/or transformation series can be retained but not viewable to users. In some cases, expungement of data can remove the transformation series in its entirety for specific properties of an object to satisfy expungement obligations or as required by law.

In some examples, individual modules may provide additional rulesets and ruleset transformations to be applied to existing and future rule sets. Data objects can have provisions for associating arbitrary data such as notes and court orders justifying the transformation, non-native media, additional narrative, etc.

FIG. 12B is a diagram illustrating an example view 1220 displayed by an application based on a layout for a specific device platform. In this example, the view 1220 represents a mobile interface displayed by a mobile platform on a mobile device. The view 1220 shows various input fields and a search functionality provided by the mobile device through the application. The input fields and search functionality in FIG. 12B are merely illustrative examples. Other examples can include more or less fields and functionalities than those shown in FIG. 12B. Moreover, the view 1220 can be customized for the mobile platform. While the view 1220 for the mobile platform can differ from the view provided for the same or similar data from a different platform, the functionalities available from the different views and platforms can be the same or significantly similar.

Figure 13:
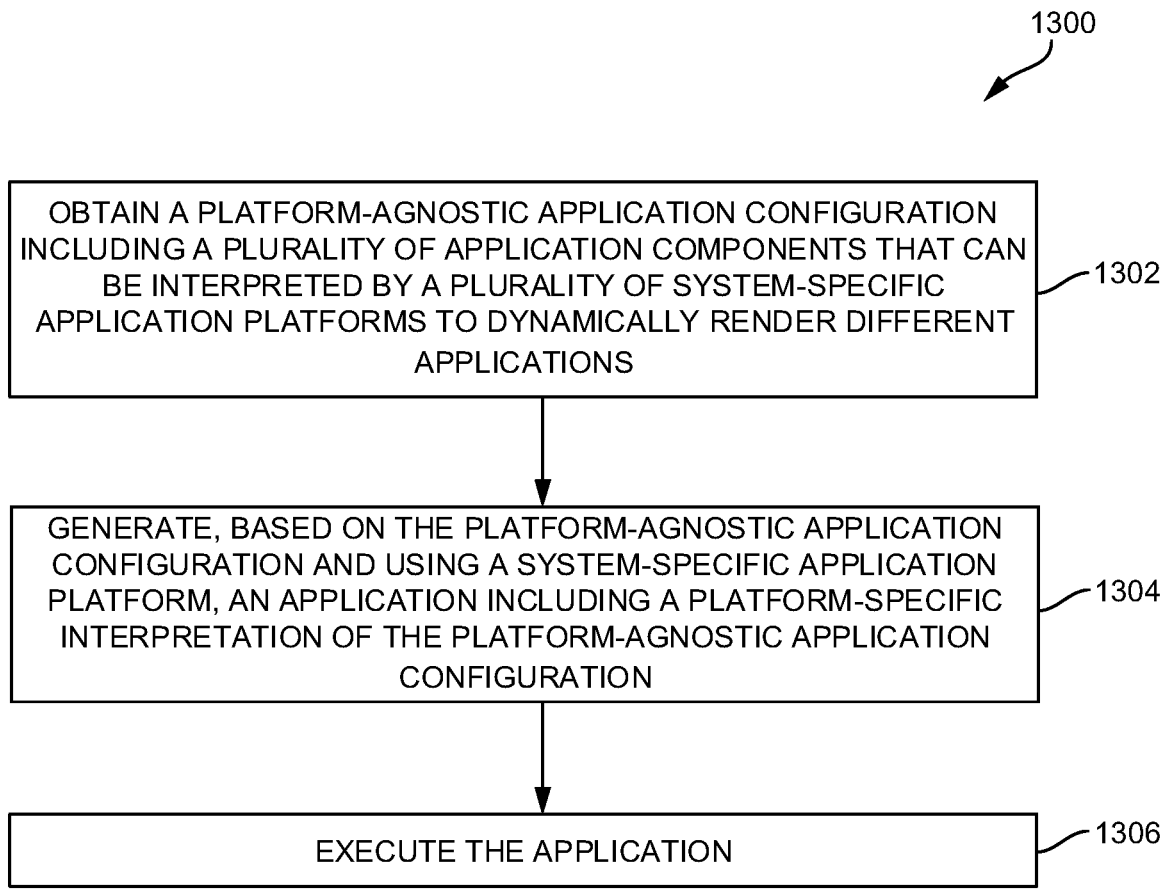
FIGS. 13 and 14 are flowcharts illustrating example methods for designing, deploying, and executing a configuration-driven application, in accordance with some examples of the present disclosure.
Figure 14:
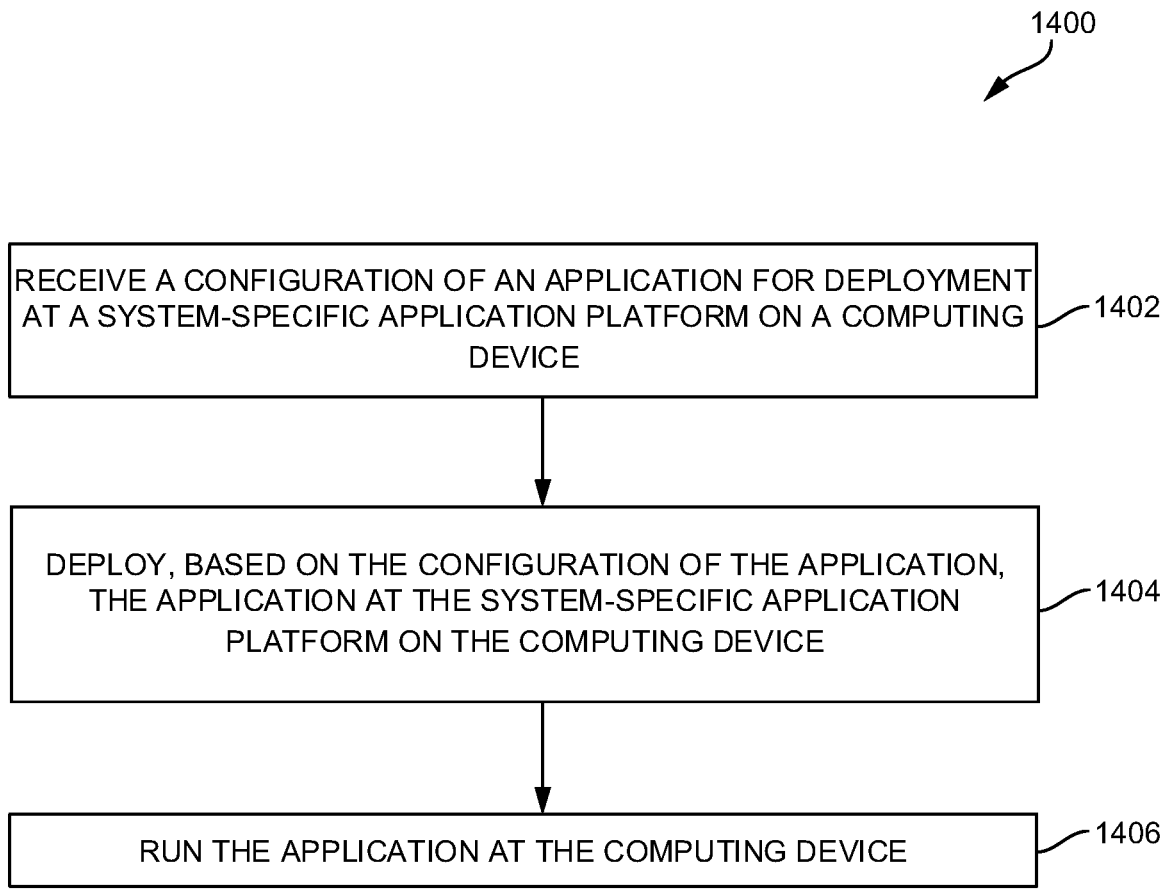

Having disclosed example systems and concepts, the disclosure now turns to the example methods 1300 and 1400 for designing, deploying, and/or executing a configuration-driven application, as shown in FIGS. 13 and 14. The steps outlined herein are examples and can be implemented in any combination thereof, including combinations that exclude, add, or modify certain steps.

At block 1302, the method 1300 can include obtaining a platform-agnostic application configuration (e.g., configuration 106) including a plurality of application components (e.g., data objects, actions, rules, layouts, permissions, etc.) that can be interpreted by a plurality of system-specific application platforms (e.g., application platforms 122) to dynamically render different applications (e.g., applications 104). In some examples, the platform-agnostic application platform can include data objects, actions, rules, layouts, and/or permissions that can be used to generate, render, and/or execute one or more applications (e.g., one or more instances of the same application, different versions of a same application, different applications, etc.).

In some examples, the system-specific application platform can include an application platform supported by different devices and/or different hardware and/or software environments. In some cases, the application can include a domain-specific application having application requirements, rules, modules, actions, layouts, and/or data objects associated with a specific domain. The specific domain can include, for example and without limitation, a specific industry, a specific business, a specific application functionality, a specific application design, a specific application environment, a specific application workflow(s), a custom application, and/or any other domain. In some cases, the different applications can include different domain-specific applications and/or different versions of one or more domain-specific applications.

At block 1304, the method 1300 can include generating, based on the platform-agnostic application configuration and using a system-specific application platform, an application including a platform-specific interpretation of the platform-agnostic application configuration. In some examples, the system-specific application platform can use the platform-agnostic application configuration to generate (dynamically or otherwise) the application. For example, the system-specific application platform can dynamically apply rules, actions, permissions, etc., in the platform-agnostic application configuration to data objects and/or layouts (or views) in the platform-agnostic application configuration, in order to dynamically generate and/or render the application based on the platform-agnostic application configuration.

At block 1306, the method 1300 can include executing the application. In some examples, the application can be executed at a computing device (e.g., client device 120A, 120B, 120N). The application can display a graphical user interface based on one or more layouts included in the platform-agnostic application configuration. In some cases, the application and/or graphical user interface can be dynamically rendered and/or generated at execution time.

In some examples, the application and/or the graphical user interface can be rendered and/or generated for execution and implementation at the system-specific application platform and/or a hardware and/or software environment of the client device. In some cases, the platform-agnostic configuration can be similarly used to generate, render, and/or execute the application at other client devices (with or without a same or different hardware and/or software environment) and/or system-specific application platform(s). In some examples, the different hardware and/or software environments can include different operating systems, different kernels, different hardware components, and/or one or more different hardware or software requirements. In some cases, the system-specific application platform can include an application platform supported by one or more hardware and/or software environments (e.g., which can include different hardware and/or software environments).

In some cases, generating the application can include interpreting the plurality of application components of the platform-agnostic application configuration, and dynamically rendering the application based on the interpreted plurality of application components.

In some examples, the plurality of application components can include data objects and object schema definitions. In some aspects, the method 1300 can include dynamically generating one or more of the object schema definitions based on a context associated with one or more of the data objects. The context can include, for example and without limitation, a relationship between data objects, one or more application modules associated with one or more requested operations, an object state associated with one or more data objects, and/or any other context item(s).

In some aspects, the method 1300 can include modifying at least a portion of the platform-agnostic application configuration and, based on the modified platform-agnostic application configuration, dynamically rendering an updated version of the application. In some cases, modifying at least a portion of the platform-agnostic application configuration can include modifying one or more application components of the plurality of application components. The one or more application components can include, for example and without limitation, an application object, an object definition, an object action, and/or an application layout describing a user interface associated with the application.

In some aspects, the method 1300 can include receiving one or more configuration updates associated with the application and, based on the one or more configuration updates, generating an updated version of the application without installing new software code for the application.

FIG. 14 is a flowchart illustrating another example method 1400 for designing, deploying, and/or executing a configuration-driven application. At block 1402, the method 1400 can include receiving (e.g., via a computing device) a configuration of an application for deployment at a system-specific application platform on a computing device. In some examples, the configuration can define data objects, layouts, rules, and/or actions that can be interpreted and applied by a plurality of system-specific application platforms to execute the application at a plurality of computing devices hosting the plurality of system-specific application platforms.

At block 1404, the method 1400 can include deploying, based on the configuration of the application, the application at the system-specific application platform on the computing device. In some examples, deploying the application can include interpreting and applying the configuration of the application at the system-specific application platform on the computing device.

At block 1406, the method 1400 can include running (e.g., executing) the application at the computing device.

In some aspects, at least a portion of the plurality of computing devices can have different hardware and/or software environments. In some examples, the different hardware and/or software environments can include different operating systems, different kernels, different hardware, and/or one or more different hardware or software requirements. In some cases, the system-specific application platform can include an application platform supported by the one or more hardware and/or software environments.

In some aspects, the application can include a domain-specific application having requirements, rules, modules, and/or data objects associated with a specific domain. In some examples, the configuration can support deployment of different domain-specific applications.

In some aspects, the method 1400 can include generating the configuration of the application for deployment at the plurality of system-specific application platforms on the plurality of computing devices. In some examples, the data objects, layouts, rules, and/or actions defined by the configuration can be interpreted and applied by the plurality of system-specific application platforms to execute the application at the plurality of computing devices.

In some aspects, the method 1400 can include receiving one or more configuration updates associated with the application; and based on the one or more configuration updates, updating the application without creating or installing new software code for the application.

Figure 15:
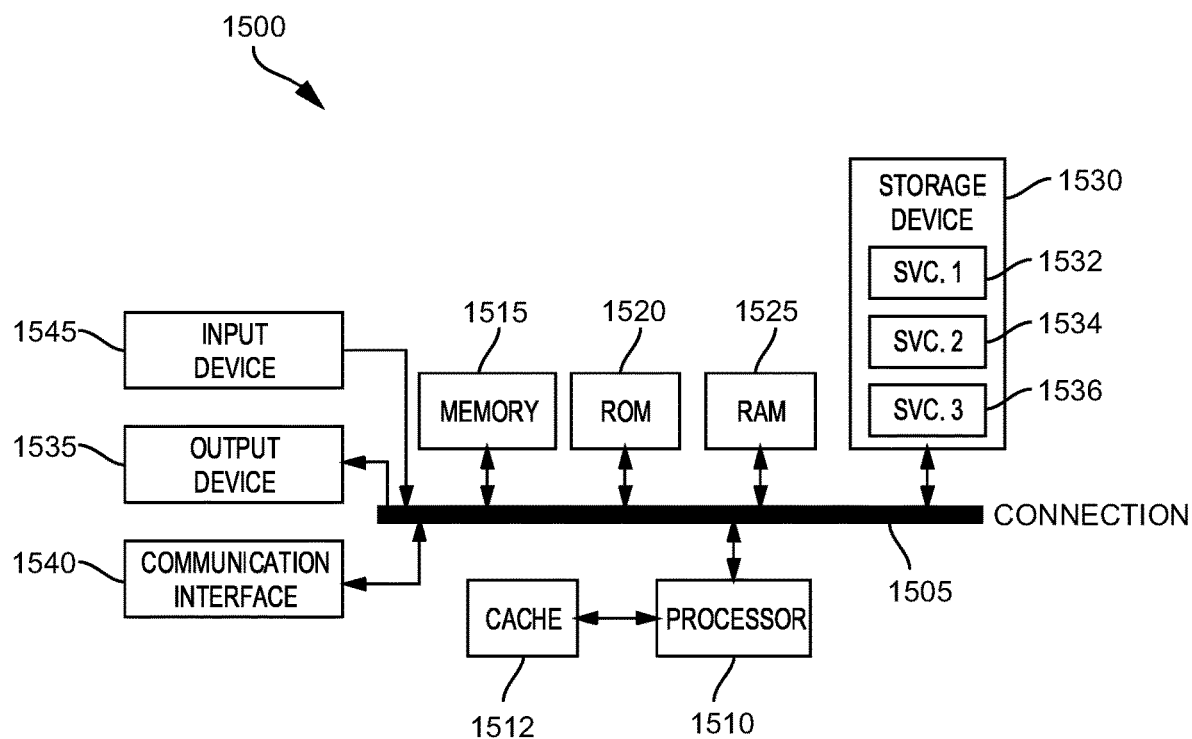
FIG. 15 illustrates an example computing device architecture, in accordance with some examples of the present disclosure.

FIG. 15 illustrates an example computing device architecture of an example computing device 1500 which can implement the various techniques described herein. For example, the computing device 1500 can implement the application system 102 or the client devices 120 shown in FIG. 1.

The components of the computing device 1500 are shown in electrical communication with each other using a connection 1505, such as a bus. The example computing device 1500 includes a processing unit (CPU or processor) 1510 and a computing device connection 1505 that couples various computing device components including the computing device memory 1515, such as read only memory (ROM) 1520 and random access memory (RAM) 1525, to the processor 1510. The computing device 1500 can include a cache of high-speed memory connected directly with, in close proximity to, or integrated as part of the processor 1510. The computing device 1500 can copy data from the memory 1515 and/or the storage device 1530 to the cache 1512 for quick access by the processor 1510. In this way, the cache can provide a performance boost that avoids processor 1510 delays while waiting for data. These and other modules can control or be configured to control the processor 1510 to perform various actions.

Other computing device memory 1515 may be available for use as well. The memory 1515 can include multiple different types of memory with different performance characteristics. The processor 1510 can include any general purpose processor and a hardware or software service stored in storage device 1530, configured to control the processor 1510 as well as a special-purpose processor where software instructions are incorporated into the processor design. The processor 1510 may be a self-contained system, containing multiple cores or processors, a bus, memory controller, cache, etc. A multi-core processor may be symmetric or asymmetric.

To enable user interaction with the computing device 1500, an input device 1545 can represent any number of input mechanisms, such as a microphone for speech, a touch-sensitive screen for gesture or graphical input, keyboard, mouse, motion input, speech and so forth. An output device 1535 can also be one or more of a number of output mechanisms known to those of skill in the art, such as a display, projector, television, speaker device, etc. In some instances, multimodal computing devices can enable a user to provide multiple types of input to communicate with the computing device 1500. The communications interface 1540 can generally govern and manage the user input and computing device output. There is no restriction on operating on any particular hardware arrangement and therefore the basic features here may easily be substituted for improved hardware or firmware arrangements as they are developed.

Storage device 1530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1525, read only memory (ROM) 1520, and hybrids thereof.

The storage device 1530 can include services for controlling the processor 1510. Other hardware or software modules are contemplated. The storage device 1530 can be connected to the computing device connection 1505. In one aspect, a hardware module that performs a particular function can include the software component stored in a computer-readable medium in connection with the necessary hardware components, such as the processor 1510, connection 1505, output device 1535, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is connected to another component either directly or indirectly, and/or any component that is in communication with another component (e.g., connected to the other component over a wired or wireless connection, and/or other suitable communication interface) either directly or indirectly.

Claim language or other language reciting "at least one of" a set or "one or more of" a set" indicates that one member of the set or multiple members of the set (in any combination) satisfy the claim. For example, claim language reciting "at least one of A and B" means A, B, or A and B. In another example, claim language reciting "one or more of A and B" means A, B, or A and B. In another example, claim language reciting "one or more of A, B, and C" means A, B, C, A and B, A and C, B and C, or all of A, B, and C.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

The invention claimed is:

1. A method comprising:
    obtaining a platform-agnostic application configuration comprising a data model of a plurality of data objects and a plurality of application components configured to be interpreted by a plurality of system-specific application platforms to dynamically render a plurality of platform-specific applications at runtime, wherein the data model includes relationship data indicative of characteristics of relationships between respective data objects of the plurality of data objects, and further includes actions indicative of interaction rules associated with the respective data objects and external communications;
    generating, based on the platform-agnostic application configuration, an application at runtime comprising a platform-specific interpretation of the platform-agnostic application configuration, wherein the application at runtime is generated by a computing device using a system-specific application platform;
    rendering, by the computing device, the application at runtime;
    receiving one or more configuration updates associated with the platform-agnostic application configuration, wherein the one or more configuration updates are agnostic to an operating environment of the computing device; and
    generating, by the computing device, an updated application without the computing device installing new or updated software code for the updated application, wherein the updated application comprises the application at runtime modified to reflect the one or more configuration updates.

2. The method of claim 1, wherein each platform-specific application of the plurality of platform-specific applications is associated with at least one of a different layout, a different functionality, or a different content.

3. The method of claim 1, wherein the same platform-agnostic application configuration is used to dynamically render each platform-specific application of the plurality of platform-specific applications.

4. The method of claim 1, wherein the plurality of application components comprises at least one of data objects, application layouts, rules, or actions.

5. The method of claim 1, wherein the plurality of system-specific application platforms comprises application platforms supported by at least one of different hardware environments or different software environments.

6. The method of claim 1, wherein the platform-specific interpretation generated at runtime comprises a domain-specific application having at least one of application requirements, rules, modules, or data objects associated with a configured domain.

7. The method of claim 1, wherein the plurality of platform-specific applications at runtime includes at least one of different domain-specific applications or variations of one or more domain-specific applications.

8. The method of claim 1, further comprising:
    modifying at least a portion of the platform-agnostic application configuration to generate the one or more configuration updates; and
    based on the one or more configuration updates, dynamically rendering an updated platform-specific version of the application at runtime.

9. The method of claim 8, wherein modifying at least a portion of the platform-agnostic application configuration comprises modifying a platform-agnostic configuration language definition of one or more application components of the plurality of application components, the one or more application components comprising at least one of an application object, an object definition, an object action, or an application layout describing a user interface associated with the application.

10. The method of claim 1, wherein generating the updated application comprises generating an updated platform-specific version of the application at runtime, based on interpreting the one or more configuration updates at runtime using the system-specific application platform at the computing device.

11. The method of claim 10, wherein generating an updated platform-specific version of the application at runtime comprises:
    applying, by the computing device, the one or more configuration updates to the platform-specific version of the application at runtime without installing new or updated software code; and
    dynamically rendering the updated platform-specific version of the application at runtime.

12. The method of claim 1, wherein the plurality of application components comprises data objects and object schema definitions defined using a platform-agnostic configuration language, the method further comprising dynamically generating one or more of the object schema definitions based on a context associated with one or more of the data objects, the context comprising at least one of a relationship between at least two data objects, one or more application modules associated with one or more requested operations, and an object state associated with the one or more data objects.

13. The method of claim 1, wherein generating a platform-specific version of the given application comprises interpreting the plurality of application components and dynamically rendering the platform-specific version of the application based on the interpreted plurality of application components.

14. A system comprising:
one or more processors; and
a computer-readable storage medium having stored thereon instructions that, when executed by the one or more processors, cause the one or more processors to:
obtain a platform-agnostic application configuration comprising a data model of a plurality of data objects and a plurality of application components configured to be interpreted by a plurality of system-specific application platforms to dynamically render a plurality of platform-specific applications at runtime, wherein the data model includes relationship data indicative of characteristics of relationships between respective data objects of the plurality of data objects, and further includes actions indicative of interaction rules associated with the respective data objects and external communications;
generate, based on the platform-agnostic application configuration, an application at runtime comprising a platform-specific interpretation of the platform-agnostic application configuration, wherein the application at runtime is generated by a computing device using a system-specific application platform;
render, by the computing device, the application at runtime;
receive one or more configuration updates associated with the platform-agnostic application configuration, wherein the one or more configuration updates are agnostic to an operating environment of the computing device; and
generate, by the computing device, an updated application without the computing device installing new or updated software code for the updated application, wherein the updated application comprises the application at runtime modified to reflect the one or more configuration updates.

15. The system of claim 14, wherein each platform-specific application of the plurality of platform-specific applications is associated with at least one of a different layout, a different functionality, or a different content.

16. The system of claim 14, wherein the same platform-agnostic application configuration is used to dynamically render each platform-specific application of the plurality of platform-specific applications.

17. The system of claim 14, wherein the plurality of application components comprises at least one of data objects, application layouts, rules, or actions.

18. The system of claim 14, wherein the plurality of system-specific application platforms comprises application platforms supported by at least one of different hardware environments or different software environments.

19. The system of claim 14, wherein the platform-specific interpretation generated at runtime comprises a domain-specific application having at least one of application requirements, rules, modules, or data objects associated with a configured domain.

20. The system of claim 14, wherein the instructions further cause the one or more processors to:
modify at least a portion of the platform-agnostic application configuration to generate the one or more configuration updates; and
based on the one or more configuration updates, dynamically render an updated platform-specific version of the application at runtime.

* * * * *